US010184392B2

(12) United States Patent
Lukaczyk et al.

(10) Patent No.: US 10,184,392 B2
(45) Date of Patent: Jan. 22, 2019

(54) SINGLE CHAMBER MULTIPLE INDEPENDENT CONTOUR ROTARY MACHINE

(71) Applicant: LUMENIUM LLC, Fredericksburg, VA (US)

(72) Inventors: William Lukaczyk, Fredericksburg, VA (US); William Anderson, Fredericksburg, VA (US); Riccardo Meldolesi, Fredericksburg, VA (US)

(73) Assignee: Lumenium LLC, Fredericksburg, VA (US)

( * ) Notice: Subject to any disclaimer, the term of this patent is extended or adjusted under 35 U.S.C. 154(b) by 222 days.

(21) Appl. No.: 15/097,928

(22) Filed: Apr. 13, 2016

(65) Prior Publication Data
US 2016/0298536 A1    Oct. 13, 2016

Related U.S. Application Data

(60) Provisional application No. 62/146,958, filed on Apr. 13, 2015.

(51) Int. Cl.
| | | |
|---|---|---|
| *F02B 55/14* | (2006.01) | |
| *F01C 21/08* | (2006.01) | |
| *F01C 17/06* | (2006.01) | |
| *F01C 1/22* | (2006.01) | |
| *F02B 55/02* | (2006.01) | |
(Continued)

(52) U.S. Cl.
CPC ............. *F02B 55/14* (2013.01); *F01C 1/22* (2013.01); *F01C 17/06* (2013.01); *F01C 21/08* (2013.01); *F02B 53/06* (2013.01); *F02B 53/10* (2013.01); *F02B 55/02* (2013.01); *F02B 55/08* (2013.01); *F02B 53/12* (2013.01); *Y02T 10/17* (2013.01)

(58) Field of Classification Search
CPC ............ F01C 17/06; F02B 55/08; F02B 55/14
See application file for complete search history.

(56) References Cited

U.S. PATENT DOCUMENTS

| | | |
|---|---|---|
| 396,176 A | 1/1889 | Simpson |
| 613,345 A | 11/1898 | White |
(Continued)

FOREIGN PATENT DOCUMENTS

| | | | |
|---|---|---|---|
| DE | 2047732 A1 * | 3/1972 | ............... F01C 1/44 |
| DE | 2853930 A1 | 6/1980 | |
(Continued)

OTHER PUBLICATIONS

International Search Report and Written Opinion in co-pending international application No. PCT/US2016/027317, dated Aug. 18, 2016.

(Continued)

*Primary Examiner* — Mary A Davis
(74) *Attorney, Agent, or Firm* — Crawford Maunu PLLC

(57) ABSTRACT

The disclosure provides rotary machines that include, in one embodiment, a rotatable shaft defining a central axis A, the shaft having a first end and a second end. The shaft can have a first hub disposed thereon with a plurality of cavities. At least one contour is slidably received into an arcuate cavity in an exterior surface of the hub. The contour has a convex outer surface that cooperates with an inwardly facing curved surface of a housing to form a working volume.

24 Claims, 32 Drawing Sheets

(51) Int. Cl.
  *F02B 55/08* (2006.01)
  *F02B 53/06* (2006.01)
  *F02B 53/10* (2006.01)
  *F02B 53/12* (2006.01)

(56) References Cited

U.S. PATENT DOCUMENTS

| | | | |
|---|---|---|---|
| 777,692 | A | 12/1904 | Phifer |
| 2,277,225 | A | 3/1942 | Green |
| 29,190,622 | | 12/1959 | Tryhom |
| 3,108,579 | A * | 10/1963 | Korf ............... F02B 55/00 418/242 |
| 3,186,385 | A | 6/1965 | Walker |
| 3,187,507 | A | 6/1965 | Artajo |
| 3,245,389 | A | 4/1966 | KorF |
| 3,259,113 | A | 7/1966 | Hamada |
| 3,289,654 | A | 12/1966 | Geiger |
| 3,295,505 | A | 1/1967 | Jordan |
| 3,302,870 | A | 2/1967 | Schell |
| 3,405,692 | A | 10/1968 | Paschke |
| 3,563,680 | A | 2/1971 | Jehle |
| 3,636,930 | A | 1/1972 | Okada |
| 3,855,977 | A | 12/1974 | Statkus |
| 3,884,600 | A | 5/1975 | Gray |
| 3,936,250 | A | 2/1976 | Mrlik |
| 3,981,645 | A | 9/1976 | Herzner |
| 4,055,156 | A | 10/1977 | Salguero |
| 4,144,866 | A | 3/1979 | Hakner |
| 4,850,447 | A | 7/1989 | Hirakushi |
| 5,380,177 | A | 1/1995 | Leroy et al. |
| 5,494,014 | A | 2/1996 | Lobb |
| 5,540,199 | A | 7/1996 | Penn |
| 5,681,157 | A | 10/1997 | Wen-Ming |
| 6,120,272 | A | 9/2000 | Gillardo |
| 6,129,068 | A | 10/2000 | Wingate, Jr. |
| 6,758,188 | B2 | 7/2004 | Woolridge |
| 7,051,698 | B2 | 5/2006 | Ollis |
| 7,621,255 | B2 | 11/2009 | Bowley |
| 8,733,317 | B2 | 5/2014 | Herbruck |
| 2003/0188711 | A1 | 10/2003 | Chou |
| 2004/0011320 | A1 | 1/2004 | Woolridge |
| 2010/0242897 | A1 | 9/2010 | Wooldridge |
| 2012/0031369 | A1 | 2/2012 | Ki |

FOREIGN PATENT DOCUMENTS

| | | | |
|---|---|---|---|
| DE | 3236811 | A1 | 5/1984 |
| EP | 1534943 | | 1/2004 |
| FR | 1446480 | A | 6/1966 |
| FR | 1446480 | A * | 7/1966 ............... F01C 1/44 |
| FR | 2234460 | A1 | 1/1975 |
| FR | 2250892 | A1 | 6/1975 |
| GB | 1454329 | A | 11/1976 |
| IN | 255824 | A1 | 3/2013 |
| JP | 47-16570 | | 5/1972 |
| JP | 56-18772 | B1 | 5/1981 |
| JP | 61-210228 | A | 9/1986 |
| JP | 63-065665 | A | 3/1988 |
| JP | 06-329675 | A | 11/1994 |
| JP | 2002-188454 | A | 7/2002 |
| JP | 4763829 | B2 | 8/2011 |
| RU | 2158834 | C1 | 11/2000 |
| WO | 2002/052125 | A1 | 7/2002 |
| WO | 2004/007926 | A1 | 1/2004 |
| WO | 2010/111557 | A2 | 9/2010 |
| WO | 2010/128776 | A2 | 11/2010 |

OTHER PUBLICATIONS

USPTO Non-Final Office Action issued in related U.S. Appl. No. 13/868,359, dated Jul. 26, 2013.
USPTO Final Office Action issued in related U.S. Appl. No. 13/868,359, dated Dec. 16, 2013.
International Search Report in related international application No. PCT/US2003/014906, dated Aug. 7, 2003.
International Preliminary Examination Report in related international application No. PCT/US2003/014906, dated Dec. 20, 2004.
Supplementary European Search Report in related European application No. 03731157, completed Jul. 6, 2009.
Decision of Refusal in related JP patent application No. 2004-521437, dated Aug. 25, 2009.
European Communication pursuant to Article 94(3) EPC in related EP patent application No. EP 03731157.8, dated Oct. 21, 2009.
Notice of Office Action in related Korean application No. 7021723/2004, transmitted May 11, 2010.
First Examination Report in related Indian patent application 2959/CHENP/2004 (IN Patent No. 255824), dated Jan. 23, 2012.
International Search Report in related international application No. PCT/US2010/028754, dated Mar. 26, 2012.
International Preliminary Report on Patentability and Written Opinion in related international application No. PCT/US2010/028754, dated Apr. 17, 2012.
USPTO Non-Final Office Action issued in related U.S. Appl. No. 12/732,160, dated Nov. 23, 2012.
USPTO Final Office Action issued in related U.S. Appl. No. 12/732,160, dated Mar. 27, 2013.
Notice of Reasons for Rejection in related JP patent application No. 2004-521437, dated Dec. 2, 2008.
International Preliminary Report on Patentability in related international application No. PCT/US2013/030649, dated Sep. 16, 2014.
Written Opinion of the International Searching Authority in related international application No. PCT/US2013/030649, dated Aug. 15, 2013.
EPO. Extended European Search Report for related European Patent Application No. 16780640.5, dated Nov. 9, 2018, 8 pages.

* cited by examiner

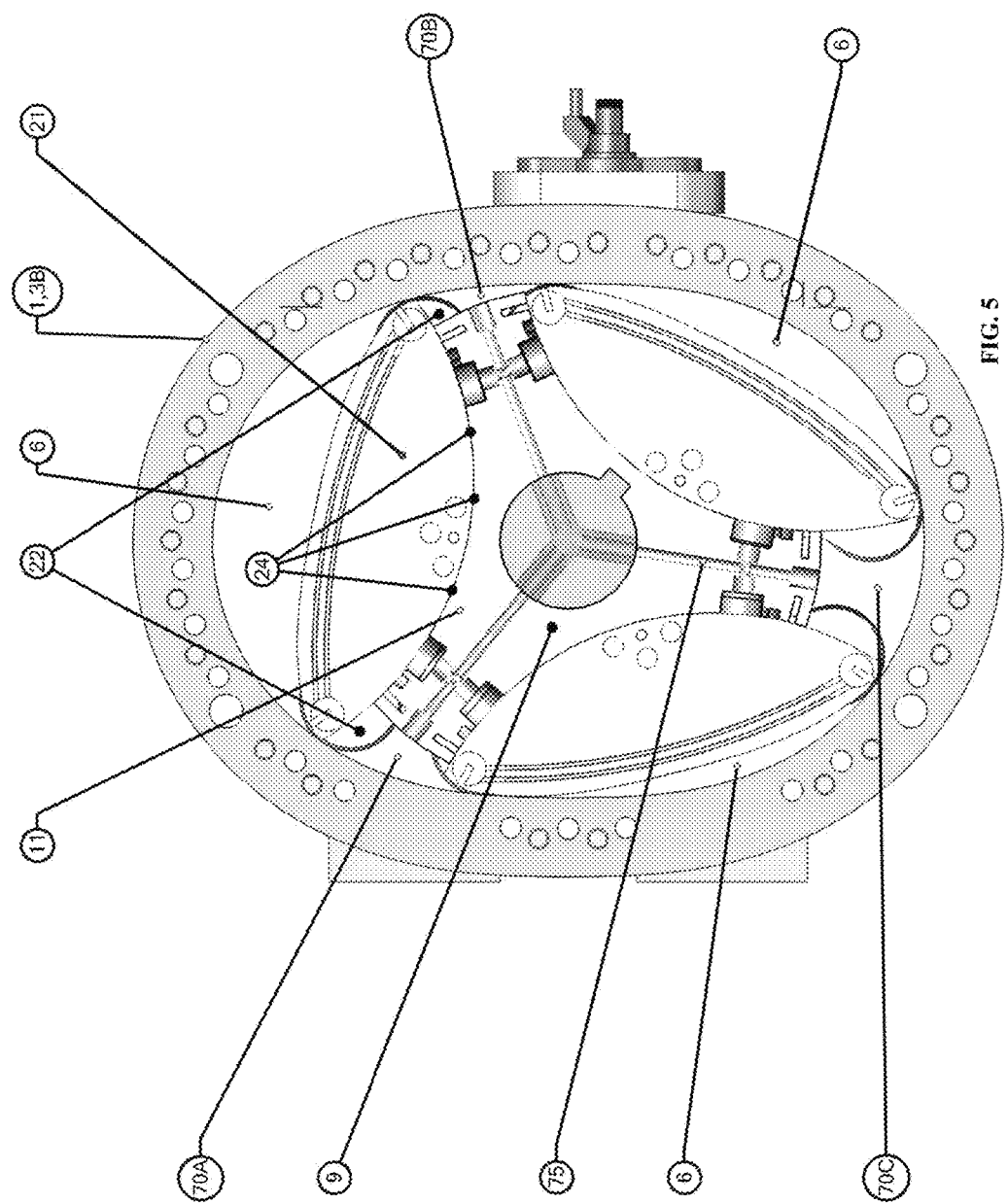

SINGLE CHAMBER MULTIPLE INDEPENDENT CONTOUR ROTARY MACHINE

CROSS-REFERENCE TO RELATED APPLICATIONS

This patent application claims the benefit of priority to U.S. Provisional Patent Application Ser. No. 62/146,958, filed Apr. 13, 2015. This patent application is related to International Patent Application No. PCT/US14/56383, filed Sep. 18, 2014, which in turn claims the benefit of priority to U.S. Provisional Patent Application Ser. No. 61/879,628, filed Sep. 18, 2013. This patent application is also related to International Patent Application No. PCT/US13/30649, filed Mar. 13, 2013, which in turn claims the benefit of priority to U.S. Provisional Patent Application Ser. No. 61/697,481, filed Sep. 6, 2012, and U.S. Provisional Patent Application Ser. No. 61/610,781, filed Mar. 14, 2012. Each of the aforementioned patent applications is incorporated by reference herein in its entirety for any purpose whatsoever.

BACKGROUND

U.S. Pat. No. 6,758,188, entitled "Continuous Torque Inverse Displacement Asymmetric Rotary Engine", the disclosure of which is incorporated herein by reference in its entirety, discloses an Inverse Displacement Asymmetric Rotary (IDAR) engine. The engine includes an inner chamber wall, an outer chamber wall, and a movable contour. U.S. patent application Ser. No. 12/732,160, filed Mar. 25, 2010 (U.S. Pat. No. 8,607,762), which is also incorporated by reference herein in its entirety, presents improved embodiments vis-à-vis the embodiments of U.S. Pat. No. 6,758,188. The present disclosure provides significant improvements over these embodiments, as described herein.

SUMMARY

The disclosed embodiments improve upon and add to embodiments described in the patents and patent applications referenced above. In some aspects, the present disclosure provides the following features:

In some implementations, the disclosure provides a rotary machine to combust an air-fuel mixture that releases chemical energy and produces usable work at a rotating shaft. The rotary machine can include a fixed housing with an oval like shape (or other suitable shape), and a central or main shaft without eccentrics or gears as shown in the first embodiment. It may secondly, use swinging arms which pivot about a shaft with cam tracks and cam followers to create the functional motion of the second embodiment. Thirdly, it can use gears, eccentrics and connecting rods to induce its functional motion as shown in the third embodiment. The machine can provide for three combustion events per revolution in a very compact space.

The device further includes combustion contour components which have the side opposite the combustion chamber in a cylindrical surface. The contours are in close proximity to a central rotatable hub attached to the central or main shaft that has matching curved, or arced surfaces that are similar to the curved, or arced surfaces of the contour. Two large bearings (e.g., either ball or oil film) can be provided to support the rotating assembly including the central or main shaft and hub. Reciprocation of the contours can be guided by rollers or pads that contact cam rings which are lubricated by an oil film. Power take off can occur directly from the central or main shaft. The combustion cycle can be either spark ignited ("SI") or compression ignited ("CI").

Induction and exhaust can be achieved through ports without valves on the fixed housing. Auxiliary chambers can be provided to prevent cross contamination of adjacent working volumes. Lower friction and better working volume sealing can be achieved by using wheels with "frictionless" bearings and cam profiles to control the motion of contours.

The disclosure further provides improved systems for conducting high voltage energy to a spark plug for spark ignition applications. Valves can be provided in the intake and exhaust flow paths in order to control gas flow timing. Integral fluid cooling passage ways can be provided for temperature regulation of the rotary machine, and rotary fluid couplings can be provided for cooling fluid and exhaust flow. Moreover, improved geometries are provided for mitigating oil consumption.

The disclosure further provides a rotary machine that includes a stationary housing defining an inwardly facing continuously curved surface, front and rear side plates attached to the stationary housing component, and a rotatable shaft defining a central axis A. The shaft has a first end and a second end, and the shaft has a first hub disposed thereon. The first hub has a body with a volume generally defined between front and rear surfaces that are spaced apart along the rotatable shaft. The front and rear surfaces lay in a plane parallel to a radial axis R, the perimeters of the front and rear surfaces defining at least one concavity through the hub configured to slidably mate with at least a portion of a first contour assembly. The first hub is situated axially between the front and rear side plates. The machine further includes a first contour assembly at least partially slidably disposed on the concavity defined on the first hub, the first contour assembly being defined by a pair of opposed outwardly facing front and rear surfaces that are connected by convex inwardly facing and outwardly facing surfaces. The convex inwardly facing surface of the contour assembly faces the at least one concavity of the first hub. The convex outwardly facing surface of the contour, the front and rear side plates and the inwardly facing continuous curved surface of the stationary housing cooperate to form a working volume. The rotatable shaft and first hub are configured to rotate with respect to the stationary housing and front and rear side plates, wherein the first contour assembly oscillates within the concavity of the hub as the hub and central shaft rotate. First and second lateral ends of the contour assembly seal against the inwardly facing continuous curved surface of the housing component as the central shaft rotates.

If desired, the rotary machine can include a plurality of contour assemblies disposed equally spaced about the axis A from each other. Each contour assembly can be configured to oscillate about an axis B that is parallel to and radially outwardly disposed from the central axis A, wherein the axis B of the contour orbits about the central axis A when the rotary machine is operating.

If desired, the rotary machine can include a plurality of contour assemblies, each contour being associated with a respective axis B. Each contour can be incorporated into a subassembly that oscillates around each respective axis B in an angular displacement substantially less than 360 degrees. In one embodiment, the rotary machine can include three or more contour assemblies. Oscillatory motion of the contour subassemblies combined with the rotation of the contour subassemblies about the central axis A can cooperate to form a compound motion.

If desired, the rotary machine can be a four cycle internal combustion engine. The hub preferably rotates 360 degrees only once to accomplish the four cycles of the engine. Components of the machine are preferably located within and move inside the stationary housing. The stationary housing is preferably affixed to a foundation that also supports a plurality of bearings that in turn rotatably supports the rotatable shaft about the axis A. The inwardly facing continuously curved surface is preferably configured to contact seals attached to the first contour assembly.

The inwardly facing continuously curved surface can include a plurality of ports defined therethrough to permit the passage of gases through the ports as the rotary machine operates. The inwardly facing continuously curved surface preferably includes at least one passage therethrough to receive at least one of a spark plug and a fuel injector. The stationary housing preferably includes two substantially parallel side plates oriented perpendicularly with respect to the axis "A" that permit the rotatable shaft to pass therethrough. At least one of the side plates and stationary housing can include seals configured to withstand pressurization and channels for transporting at least one of a lubricant and a coolant. The working volume associated with the first contour assembly preferably increases and decreases in volume twice per revolution of the hub.

In some embodiments, the oscillatory motion of the contour sub assembly can be driven by a stationary gear that intermeshes with a contour gear integrated with the contour sub assembly. The stationary gear can have twice as many teeth as the contour gear. Each contour sub assembly can include only one contour gear, if desired, or may include two contour gears, wherein one gear is attached at each end of the contour sub assembly, on either side of the engine. Preferably, the contour gears are coplanar that are located on the same side of each working volume whether one or two contour gears is provided on each contour sub assembly.

Preferably, each contour gear is mounted on a contour gear shaft, and each shaft including said each contour gear is mounted on a low friction bearing. Each contour gear can be mounted on a shaft that is eccentric with respect to an end of a swing arm portion of the contour sub assembly. Generally, the components of the rotary machine are configured to prevent collisions between the oscillating contour subassembly and any stationary parts of the machine. The components of the machine can be configured to provide a compression ratio that exceeds 20:1, 25:1 or 30:1. Each contour gear is preferably configured to mesh with a stationary gear. The rotary machine can include a plurality of floating seals to prevent the loss of gases from the working volume during operation of the rotary machine.

In accordance with a further aspect, the rotary machine can further include secondary working volumes defined between the contour assemblies. The working volume can be separated from the secondary working volumes by at least one seal. A working volume can be defined with respect of each contour assembly, and the gases of a first working volume accordingly cannot directly communicate with a second working volume due to the presence of at least one secondary working volume that is disposed between the first and second working volumes. The rotary machine can include a seal carrier ring disposed within the contour subassemblies that includes floating seals to prevent the passage of gases thereby.

In accordance with a further embodiment, the oscillatory motion of the contour subassemblies can be driven by an orbiting cam follower riding in a stationary cam track defined in a cam plate, the track having two surfaces, each track surface being configured to contact a different surface of the cam follower. The cam follower can be attached to a swing arm that pivots about an axis B which is parallel to and orbits about axis A. A plurality of cam plates can be provided, each cam plate mating with a respective cam follower. Any embodiment disclosed herein can be provided with a fuel injector and/or a spark plug in fluid communication with the working volume.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the methods and systems of the disclosure. Together with the description, the drawings serve to explain the principles of the disclosed embodiments.

BRIEF DESCRIPTION OF DRAWINGS

Accompanying the description are plural images illustrating the disclosed embodiments, which represent non-limiting, examples and in which:

FIG. 5 is a cut-away end view of the first embodiment of FIG. 1;

DETAILED DESCRIPTION OF THE DISCLOSED EMBODIMENTS

Figure 1:
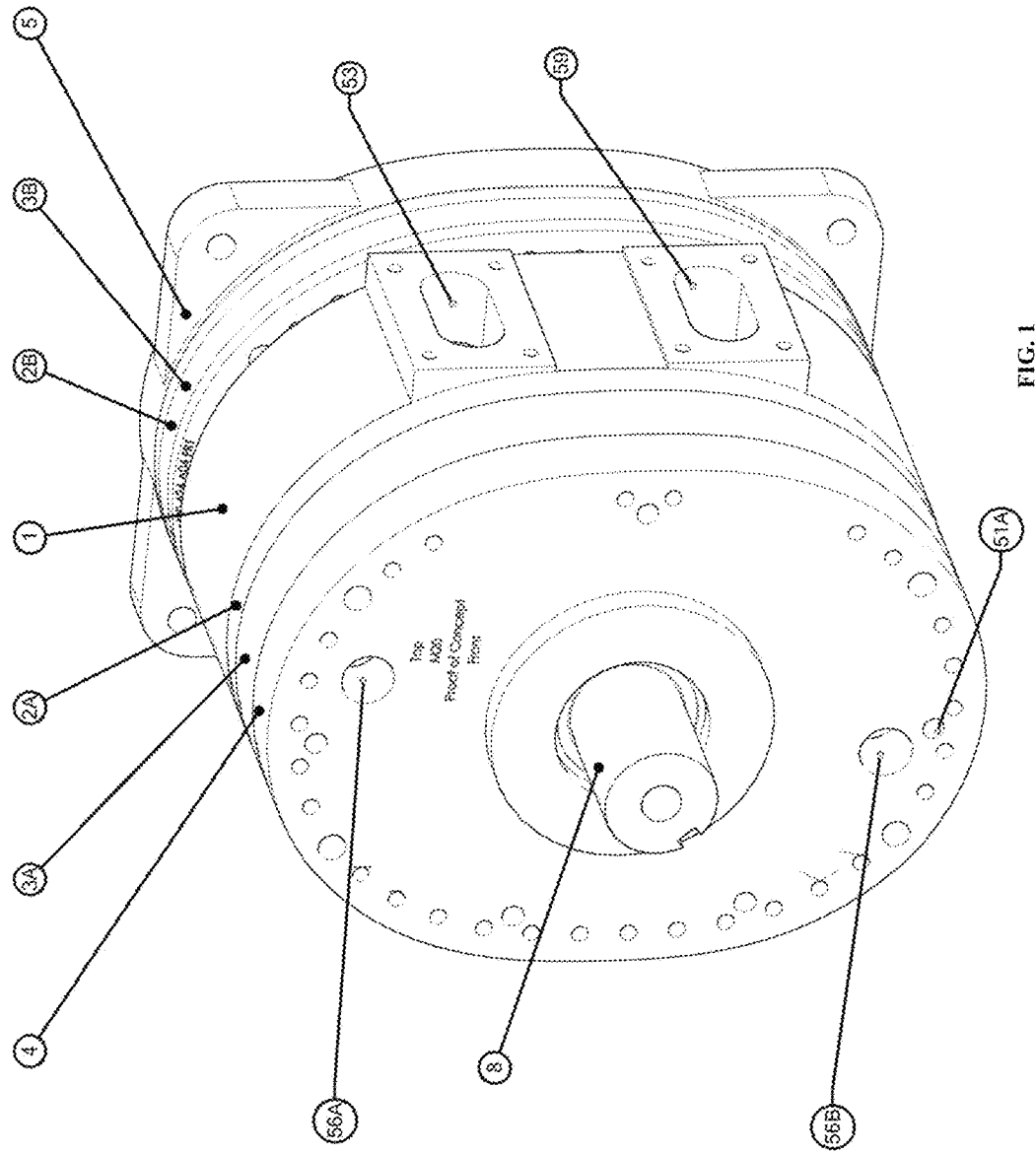
FIG. 1 illustrates an isometric view of an embodiment of a rotary machine in accordance with the disclosure.
Figure 2:
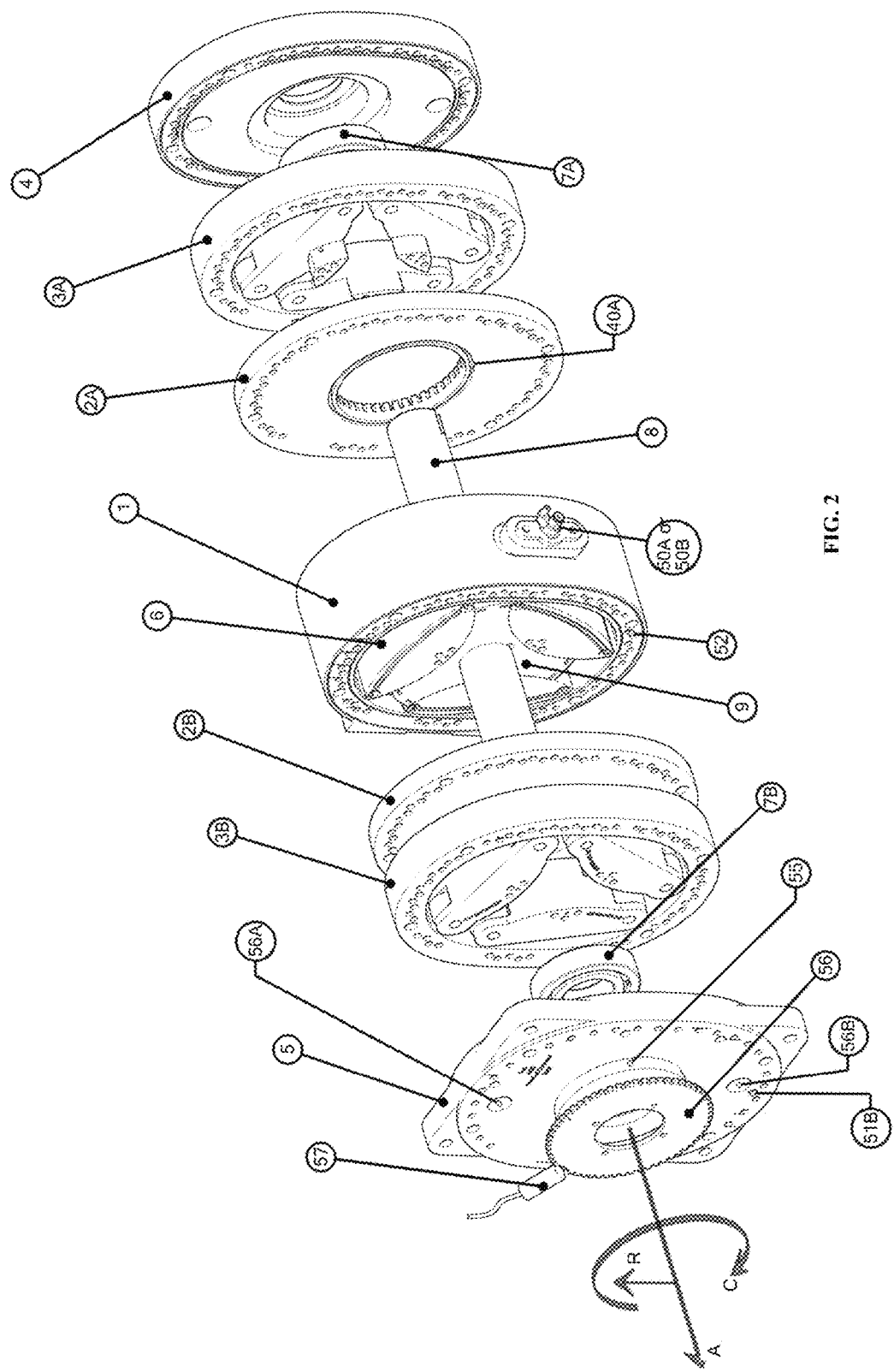
FIG. 2 is an exploded view of the first embodiment of FIG. 1.

Referring to FIG. 2, components are illustrated which form the disclosed embodiments. In addition, a coordinate system is illustrated which will be utilized for discussing the disclosed embodiments. This coordinate system is a cylindrical, three dimensional system, consisting of axial (A), radial (R) and circumferential (C) axes. As illustrated in the FIG. 2, a fixed housing "Center Section" 1 has fixed thickness and its interior represents one of the internal surfaces of the working volume 6. This Center Section 1, is held by subsequent sections that are bolted to it. Any such sections can have mounting features to fix the machine to a supporting structure. For the example shown in FIG. 1 or 2, the mountings are in section 5.

Working out from the center of the device, the stationary center section 1 as shown in FIG. 2, has both its flat and parallel sides mated to two separate front 2A and rear 2B side plates. The mechanical interface of the parts, has features that make the joint gas tight. Side plates 2A and 2B are part of the internal surfaces of the working volume 6. Next, attached to the side plates 2A and 2B are cam rings front 3A and rear 3B. Again these rings also have a gas tight seal to the side plates 2A or 2B. Lastly case front enclosure 4 and case rear enclosure 5 are also bolted to the cam rings 3A and 3B respectively, to complete the machine's enclosure.

As illustrated in FIG. 2, mechanically fastened to or integrated to the front and rear case enclosures 4 and 5 are frictionless bearings of the roller, ball or oil film type 7A and 7B. Said bearings support a rotatable shaft 8.

Figure 3:
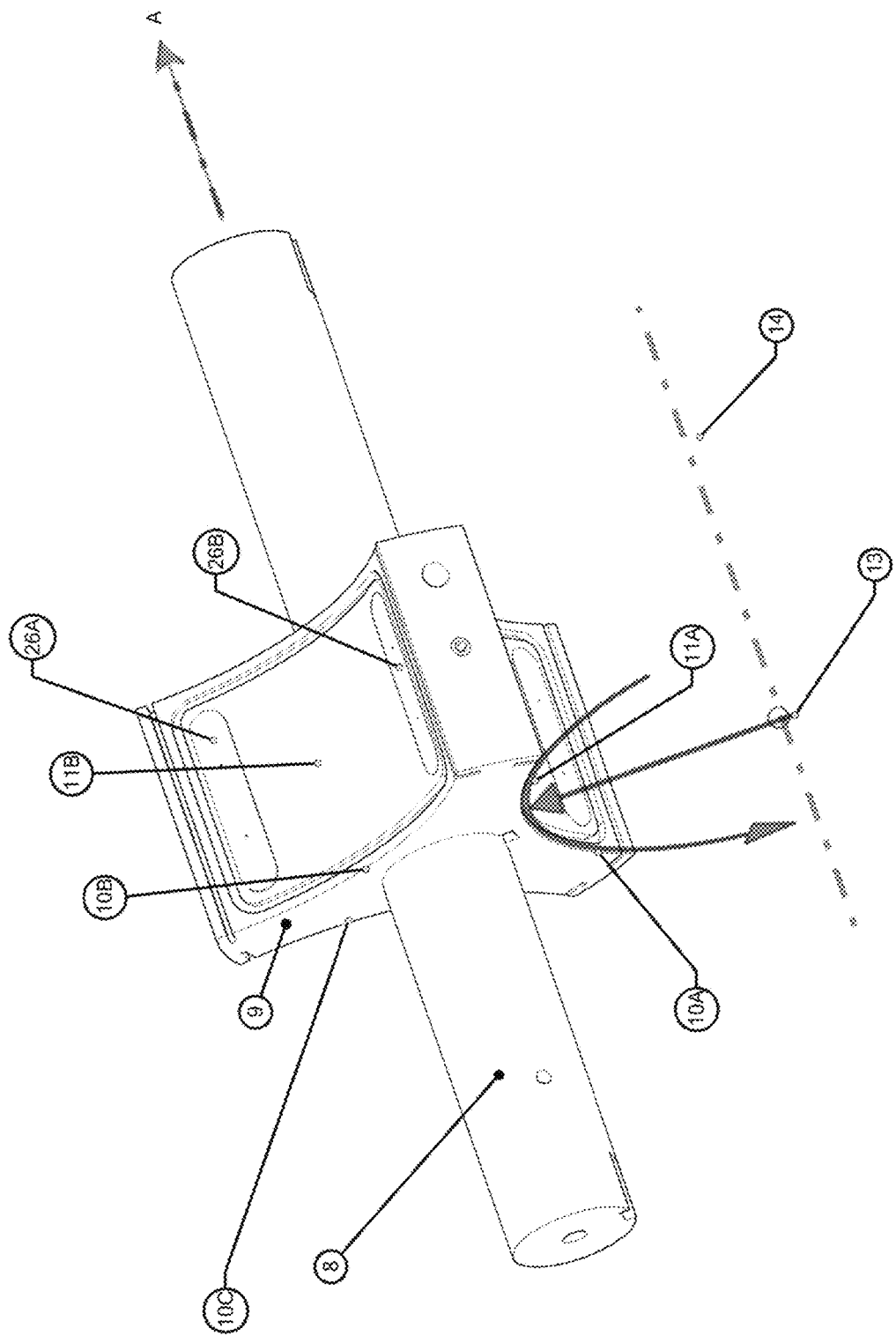
FIG. 3 is an isometric view of a rotating hub assembly of the first embodiment of FIG. 1.

Rotatable shaft 8 has mounted on it in a fixed angular displacement, a center hub 9 that rotates on the same axis as the shaft 8 as shown in FIG. 3. Hub 9 is approximately the same or slightly less in thickness than center section 1. Hub 9 is disposed between side plates 2A and 2B as shown in FIG. 2. FIG. 3 shows that hub 9 has a multiplicity of concave arcs 10 A, B, C, (three are shown, but it will be appreciated that there could be more or less), to which the center of these arcs a point in space 13 is defined that is significantly farther out from the center of the hub's rotation. A line drawn between any one of the arc centers and the center of shaft 8 and hub 9 rotation would be radial (R) from the axis of rotation (A).

The concave arcs of hub 9 are approximately extruded in the A axis direction to form incomplete cylindrical surfaces 11 A, B, C of FIG. 3. The center of these cylinders is shown as respectively line 14. The surfaces 11 may have features which allow a load bearing, sliding surface, provide oil feed and retention, compensate for thermal expansion and contraction, provide for high load durable wear surface and limit the flow of gases.

Figure 4:
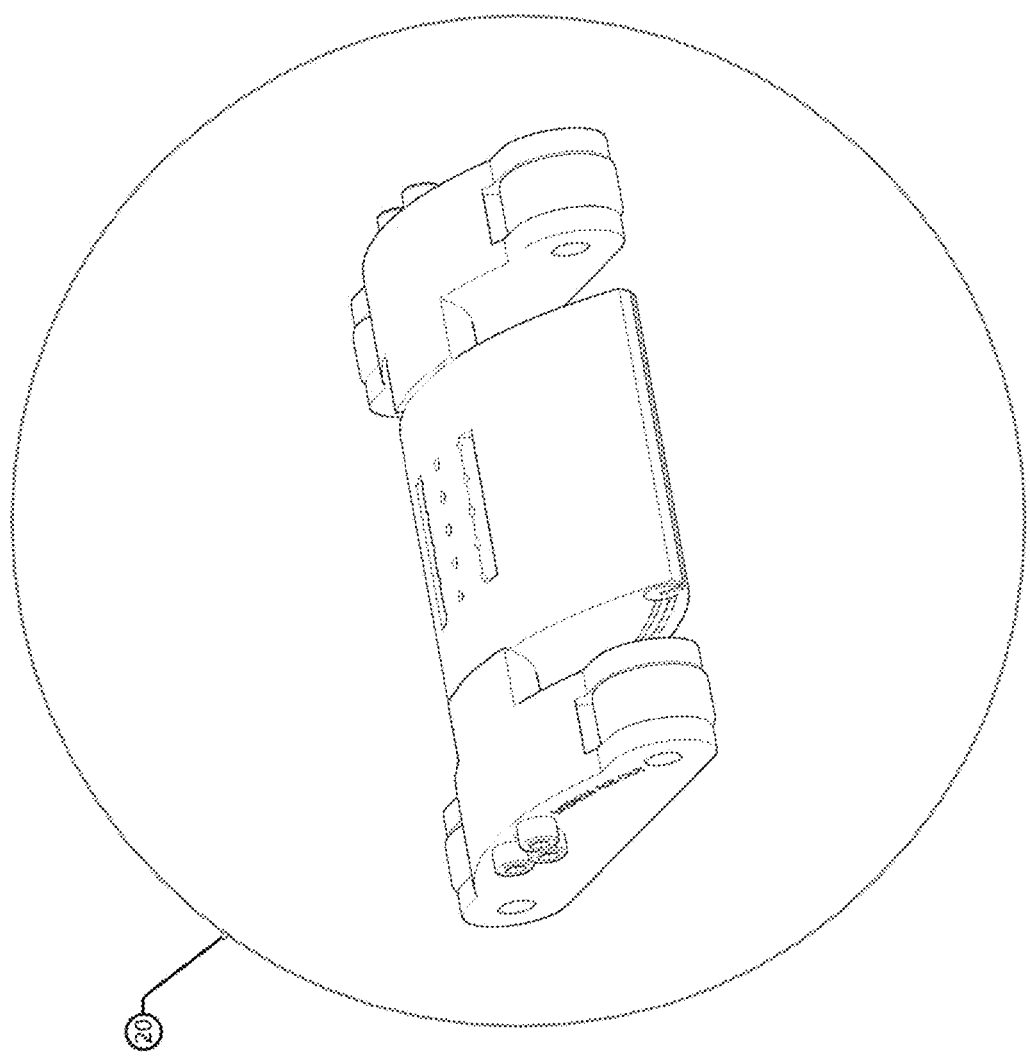
FIG. 4 is an isometric view of a contour assembly of the first embodiment of FIG. 1.
Figure 4A:
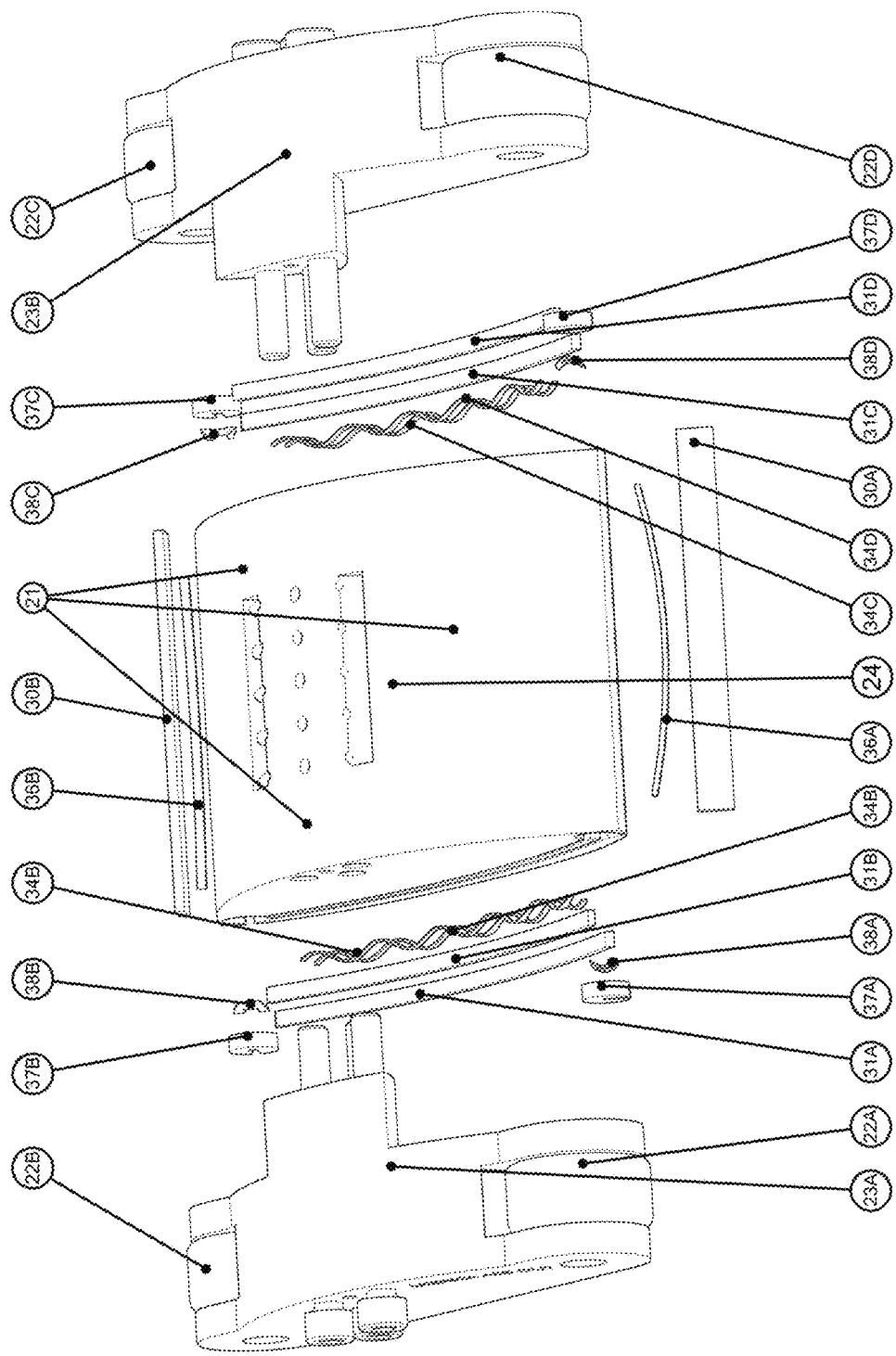
FIG. 4A is an isometric exploded view of the contour assembly of FIG. 4.

The contour assembly 20 as shown in FIGS. 4 and 4A, includes a contour 21, four track rollers 22 A, B, C, D, two track roller support yokes 23A and 23B, and various sealing parts discussed below. The contour 21 is described by a convex arc, and an incomplete cylindrical surface 24 that is disposed directly opposite the working volume surface. The convex arc surface 24 has approximately the same or slightly smaller radius as the concave arc surface 11 in the hub. The center of the arc surface 24 can be considered to be nearly coincident with line 14 in FIG. 3. Surface 24 has features which allow a load bearing, sliding surface, provide oil feed and retention, compensate for thermal expansion and contraction, provide for high load durable wear surface, and limit the flow of gases.

The parts in FIG. 5 actuate the motion of the contour assembly 20. The contour assembly 20 has the cylinder surface 24 of contour 21 in close proximity or touching the mating surface ii of hub 9. This connection allows the contour assembly 20 to pivot or oscillate in the plane as viewed in FIG. 5 about an imaginary center axis B, represented by line 14 shown in FIG. 3. Surface 24, center line tracks collinear to hub 9's axis B, line 14. To reduce friction, such interface of arc surfaces may be coupled to a pair of special pads, 26A, 26B of FIG. 3, which are pressed up against the contour 21 or alternatively such low friction can be obtained by an oil film which is constantly replenished by a pressurized oil system or by low friction rollers. The contour assembly includes contour motion control rollers 22A,B,C,D attached to support yoke 23A and 23B with pins or other devices. Support yokes 23A and 23B are attached to contour 21 by fasteners as shown in FIG. 4A. The position and radii of the surfaces 22 of rollers are chosen to minimize the travel of the sealing systems described later. This shape may or may not be a common geometric shape when viewed directly upon the flat surface. As the hub 9, rotates, carrying the contour assembly 20, in an irregular orbit around the center of rotation "A", the cylinder surfaces 11 and 24 interact as well as the rollers 22 contact the cam surfaces to force an oscillation in the clockwise and counter clockwise direction with respect to the hub 9's reference point 13.

As shaft 8 and hub 9 rotate about axis A and contour assembly 20 oscillates with pads 26A&B in contact with surface 24, center section 1 and confining side plates 2A and 2B, form the variable working volume 6. The volume of 6 increases then decreases in a repetitive fashion twice per revolution. This change in working volume creates the necessary strokes of the 4 stroke internal combustion engine.

Rollers 22 also interact with the interior cam rings 3A and 3B surfaces thus resisting centripetal force and minimizing the travel of apex seals 30A and 30B in their retaining slots.

The contour 21 of contour assembly 20 is slightly narrower than the thickness of the center housing 1 and may be made of materials not conducive to wear. Contour 21 could be made from aluminum or other lightweight materials as well as it could be made from cast iron or forged steel. A gap, which is to be sealed, is defined between the contour 21 and the adjacent side plates 2A, 2B. To bridge this gap and keep gases in the working volume, the floating side seals 31 A, B, C, D (FIG. 4A) are embedded in opposing flat faces of the contour 21. The side seals 31A,B,C,D sit atop the preloading wavy springs 34 A, B, C, D.

To prevent gases from leaking out the apex points of contour 8 (FIG. 4A) floating seals 30A, 30B of FIG. 4A are inserted into transverse, axially extending, matching slots in the contour body 21. The seals 30 A, B and matching channels are dimensioned to minimize leakage over the top and around 30A,B but still allow movement of the floating seal.

Preloading springs 36A, 36B (FIG. 4A) maintain a nominal seal contact force of the apex seals 30A, 30B. For enhancing seal contact force, internal gas pressure within working volume 6 creates an unbalanced load on the seals, thus increasing the seal contact force at 30A and 30B proportionally to the internal pressure of the working volume 6.

Preloading springs, 36A and 36B furthermore assist in correcting for differences in the motion and wear at the contact points of 30A and 30B.

To further enhance sealing, corner seals 37 A, B, C, D, each including one respectively preload springs 38 A, B, C, D are installed in matching pockets.

Two additional ring shaped seals 40A and 40B of FIG. 2, made of metal, rubber or composite material, for example, lies between side plates 2A and 2B and hub 9 to minimize oil leakage into the combustion area and combustion gasses into the oiled areas. Preload springs may be behind these sealing rings to improve their performance.

FIGS. 1 and 2 illustrate features which are incorporated into the stationary parts of the engine. These include sparkplug 50A or diesel fuel injector 50B (as desired), liquid cooling inlets 51A, liquid cooling outlets 51B, interior liquid cooling passages 52, air-fuel inlet passageway 53, exhaust gas passageway 59, oil inlet hole 55, case ventilation holes 56A and oil drain output 56B. A magnetic or Hall Effect position sensor is located at 57 to detect the angular velocity and location of the rotating shaft by magnetic means of detecting the passage of the teeth of the tone wheel 58. This sensor's electrical output is attached to the necessary but not shown electronic ignition circuits that make the spark plug ignite.

Other accessories not shown but that can form a portion of the machine include, for example, a high pressure fuel pump for diesel or gasoline injection, an oil pump for recirculating oil, an oil pressure regulator, an oil filter, an oil cooler, an oil coupler to route oil into the rotating shaft 8, a water pump, a water heat radiator, a thermostat, an expansion tank and other devices common on modern internal combustion engines.

FIG. 5 shows auxiliary variable volumes 70 A, B, C that reside between the primary working volumes 6 when configured with a multiplicity of contour assemblies 20. These volumes are used to separate the adjacent working volumes from cross contamination and other ill effects to promote efficient combustion in the working volumes 6. The auxiliary volumes may be contained by use of additional apex seals and pre-load springs to keep any pressurized gases from leaking into other parts of the engine. To minimize the pumping losses of these auxiliary volumes the volumes may be cross connected with passageways to each other. Such connections are shown as 75 A, B, C. Or, the auxiliary volume pumping action can be used for other purposes.

Figure 6:
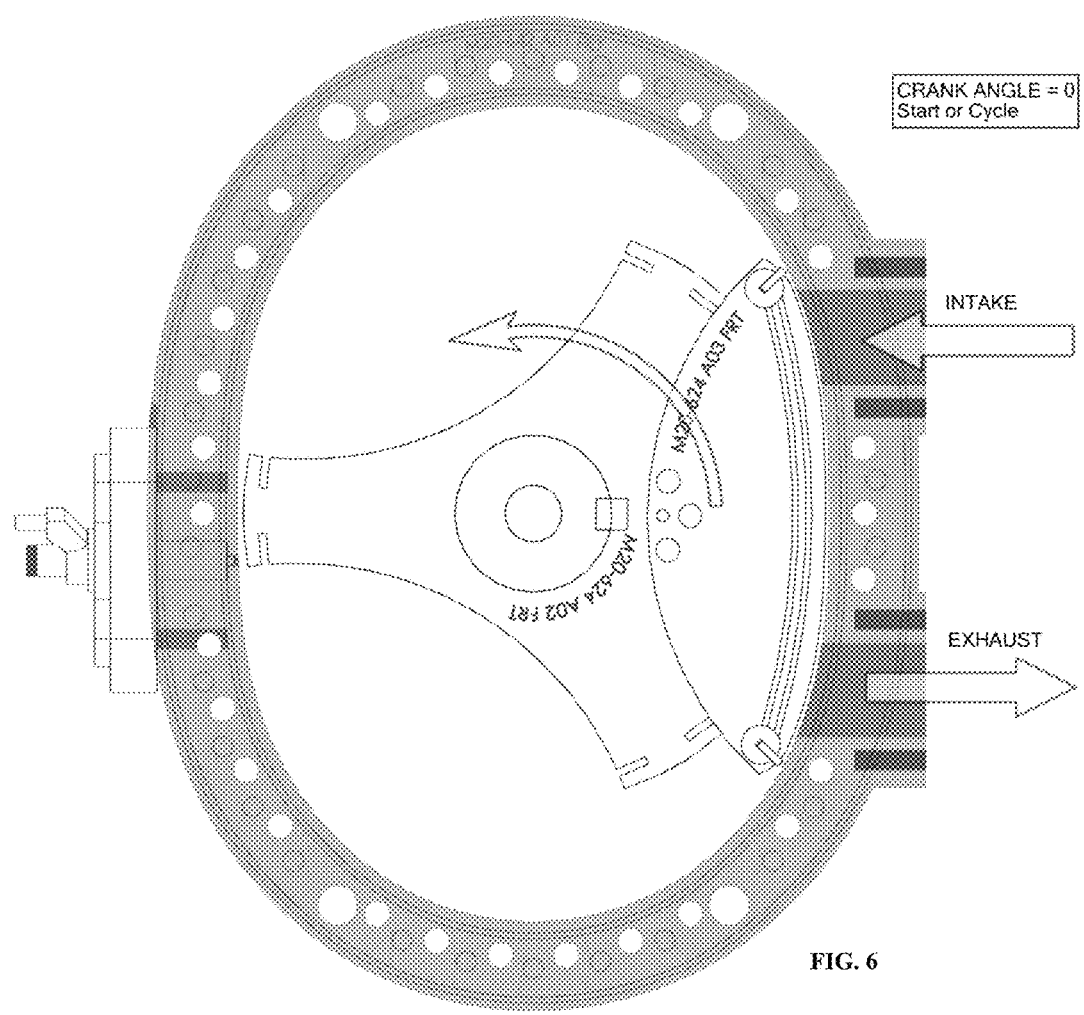
FIGS. 6-13 illustrate various portions of a combustion cycle of the all embodiments.
Figure 7:
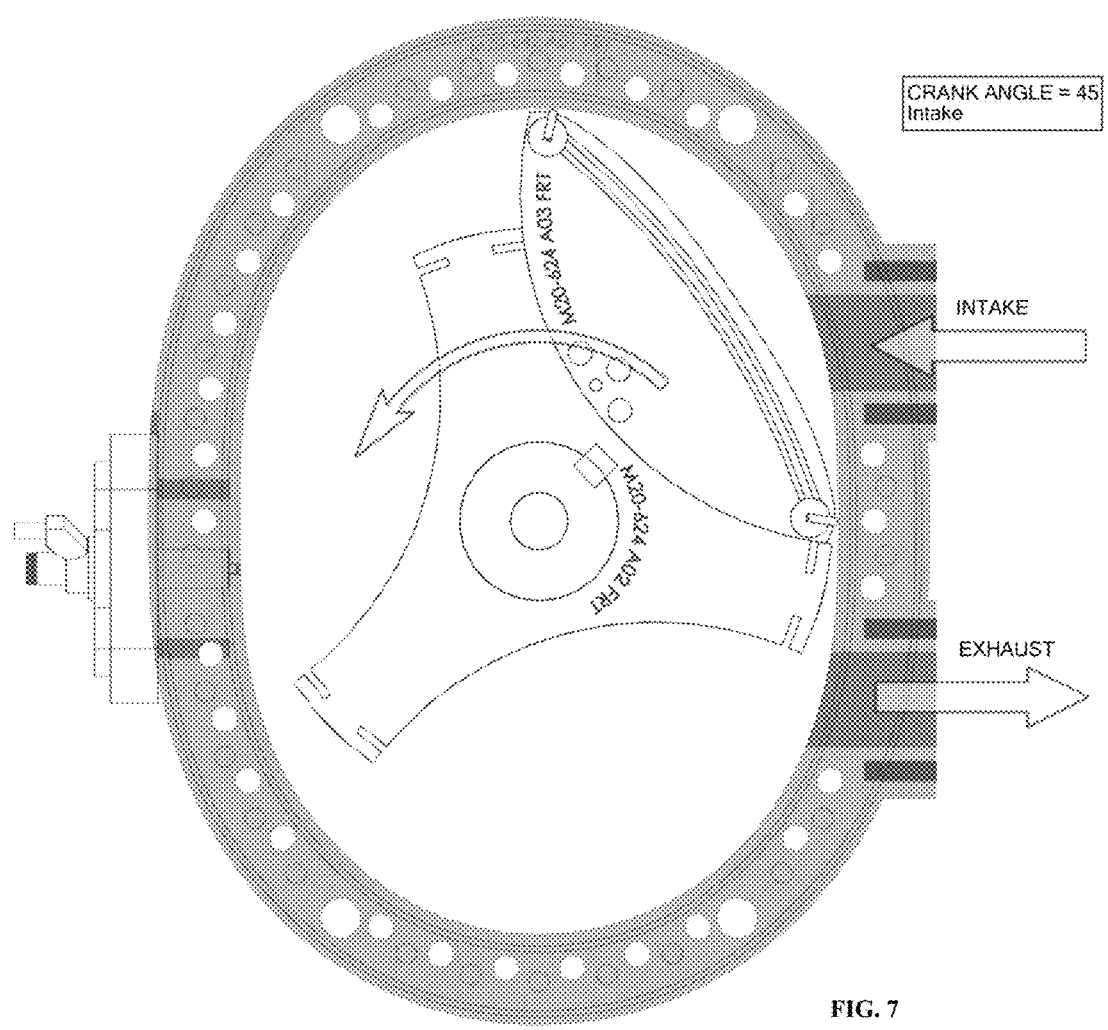

When used as a spark ignited internal combustion engine, a carburetor or fuel injector and throttle plate (not shown) creates the appropriate air & fuel mixture and is plumbed to intake passageway 53 of FIG. 6. 53 leads to a port in the interior surface of center housing 1. Said air & fuel comes out of the port and enters the working volume. When the contour assembly 20 spins around such that the working volume 6 passes over the intake port, the air & fuel mixture is sucked into the working volume 6 as shown in FIG. 7.

Figure 8:
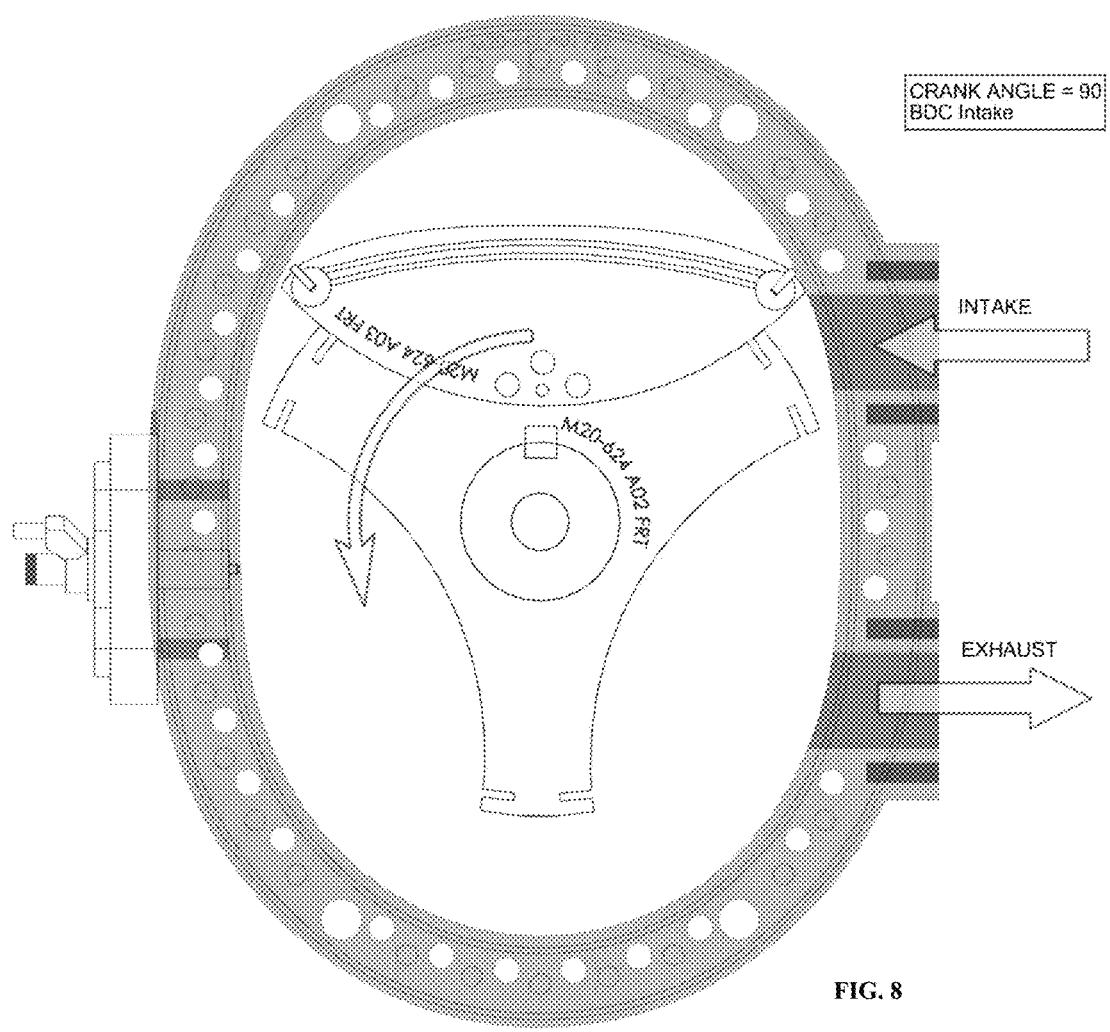
Figure 9:
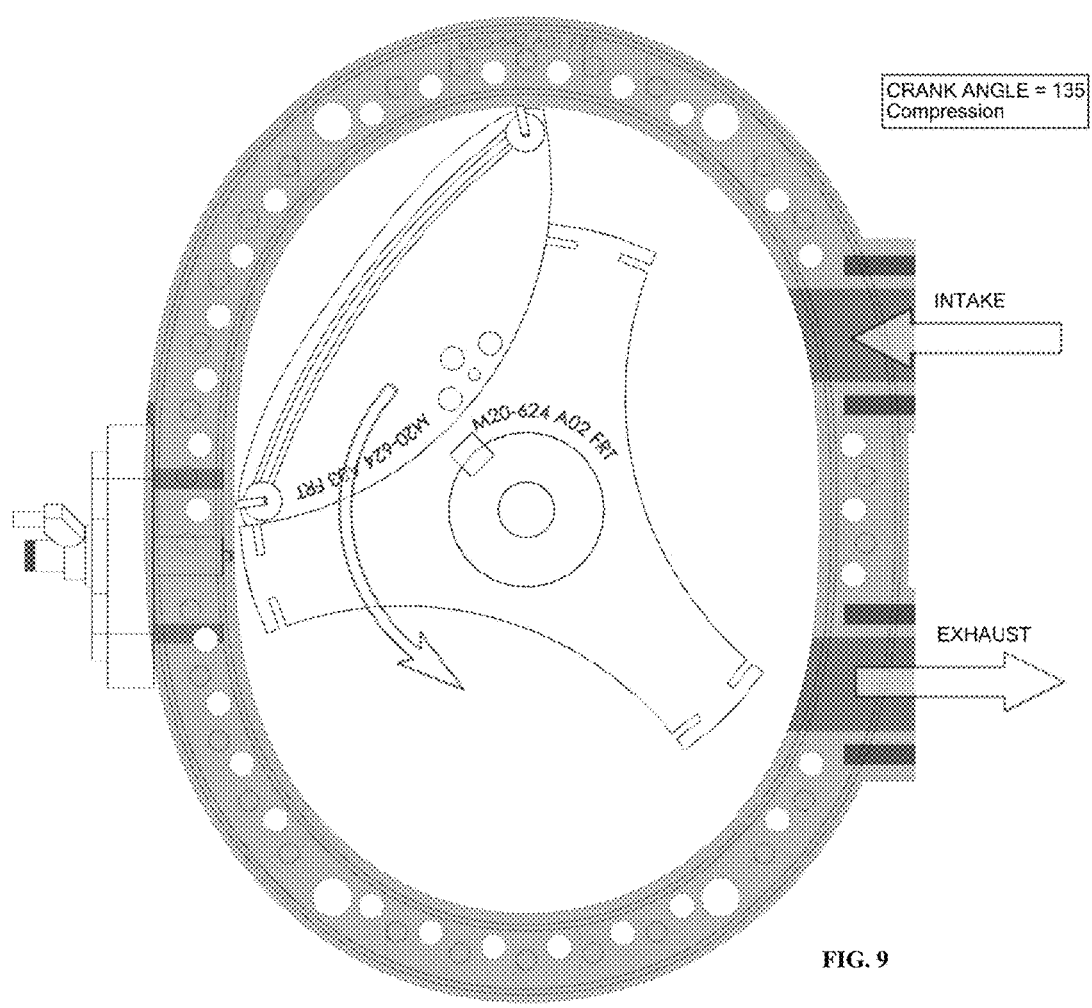

As the contour assembly 20 continues to orbit around the center of the shaft 8, the air fuel mixture begins to compress as shown in FIG. 8. At or near the point of minimum volume of 6, shown in FIG. 9, one or more sparkplug(s) 50 is (are) electrically ignited by high voltage electricity from appropriate circuitry. Such ignition initiates the burn of the air & fuel mixture and the subsequent expansion of gasses in the working volume 6. These gases push on contour 21 and the mechanism creates rotary work upon hub 9 and then shaft 8 as in FIG. 10.

Figure 11:
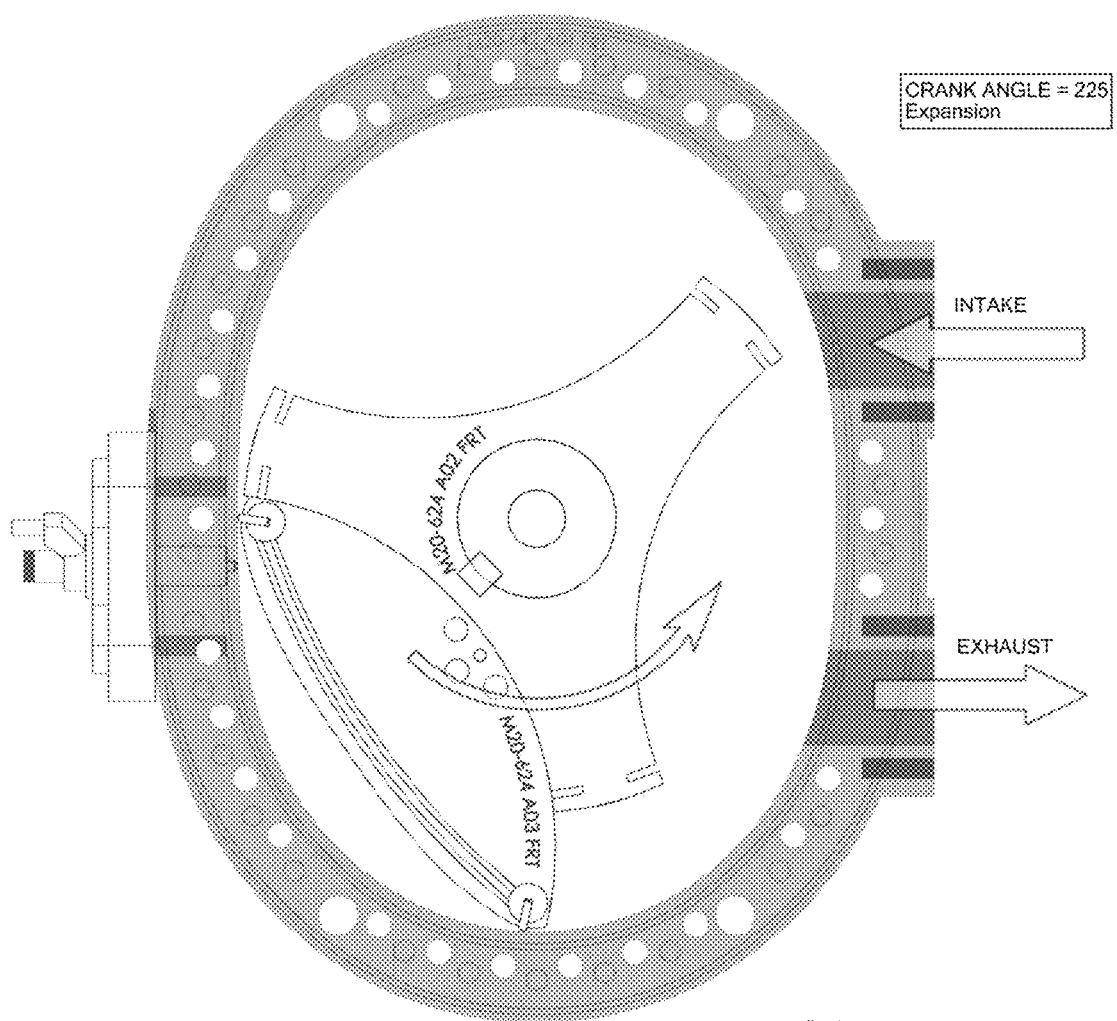

After usable combustion work is spent, the contour is at the position shown in FIG. 11. The lower port is designated for exhaust gases and leads to opening 59 of FIG. 1. FIG. 1 shows the beginning of the exhaust stroke where working volume 6 connects to the exhaust passageway. Spent gases are pushed out this port by the falling working volume 6. Exhaust gases then come out passageway 59 which is connected to an exhaust pipe.

The contour assembly 20 continues to orbit around until inlet passageway 53 connects into the working volume and the combustion cycle is repeated.

If three contour assemblies are used as shown in FIG. 5, a total of three complete combustion cycles are performed in one revolution. When the engine is configured for compression ignition (diesel), the spark plugs are replaced by a high pressure diesel fuel injector 50B. Such fuel injector is supplied high pressure fuel from a timed diesel pump or electronic "common" rail pressure system. The intake, compression, power and exhaust strokes work the same as the spark ignited however no fuel is entrained in the air portion of the intake stroke. At or near the point of peak compression, a specially timed mechanical diesel pump linked to the rotational position of shaft 8 emits a high pressure fuel pulse which is plumbed to a special injector located at the exterior of the center housing. Such high pressure pulse causes the fuel injector 50B to rapidly release or "pop off" and emit fuel at a high rate directly into the compressed air in the working volume. This causes spontaneous self-ignition of the fuel and the release of chemical energy to which useful work is recovered.

Alternatively, a modern electronic module "reads" a tone wheel 56 by way of sensor 57 shown in FIG. 2 and calculates the exact starting time and duration to energize an electrically actuated injector and thus create the high rate of fuel injection. The calculation is based on other sensor inputs such as throttle position (load demand), temperature, intake pressure, exhaust pollution controls, etc. Such system is called "common rail" as it obtains fuel that is continuously held at the desired very high pressure in a common fuel rail.

The embodiment shows three such contour assemblies 20, orbiting around a shaft 8, hence 3 three complete combustion cycles are performed in one revolution. Three combustion cycles will occur in one shaft rotation, regardless if spark or compression ignition is used.

The shape of the cam profiles and location of ports can be chosen to modify the variation in working volume over the engine cycle so as to exhibit a power stroke maximum volume which is larger than the intake stroke maximum volume. The length and closing point of intake port 54 can be modified to simulate a smaller intake stroke volume. When the expansion volume is larger than the intake volume, it is said to be an "Atkinson Cycle". The ratio of the expansion volume over the intake volume is known as Atkinson ratio. Ratios significantly greater than 1.0 can produce higher fuel efficiency combustion engines. Particular geometry details of the invention can be easily modified to boost the Atkinson ratio well over 1.0.

As the combustion of fuel creates significant heat, liquid cooling passageways 52 are incorporated into the center housing shown on FIG. 1.

To allow for lubrication of friction surfaces within the engine, pressurized oil is pumped into oil inlet hole 55 and then released inside shaft 8 and in to the hub 9. Oil is routed to strategic places to reduce friction and cool parts. Oil is then transferred through the arc surface interface of 11-24 and then flows into passageways inside contour 21. Oil circulates through contour 21 to pick up heat and transport heat out of the contour 21. Once through the contour 21, it goes into holes in the support yoke 23A or 23B and then out into the galley which contains the rollers and cam rings.

To further cool the surfaces of working volume 6, channels are formed into the opposite side from the working volume in side plates 2A and 2B. This allows lubricating oil to more effectively remove excess heat from the side plates. Alternatively, closed passageways can be built into the side plates 2A and 2B whereby the liquid in the perimeter of the housing sections can transverse the hotter interiors of these side plates and remove heat.

Once oil is present in the roller galley, it is collected at holes 56B disposed at front and rear. Appropriate piping or integral passageways directs this oil down to a holding vessel, not shown. Then the oil is pumped up to the necessary pressure, filtered, cooled and recirculated back to the engine at inlet hole 55.

Figure 10:
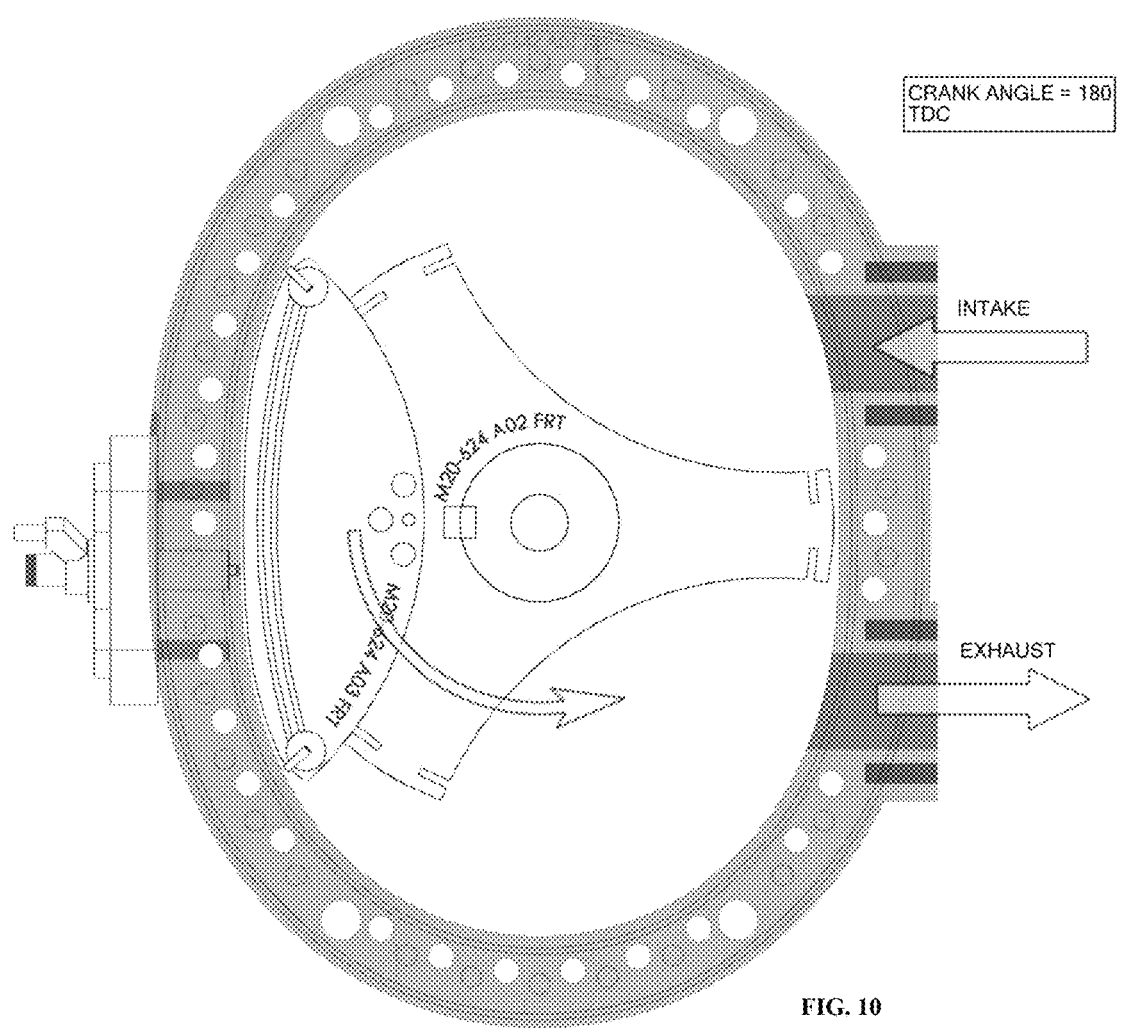
Figure 12:
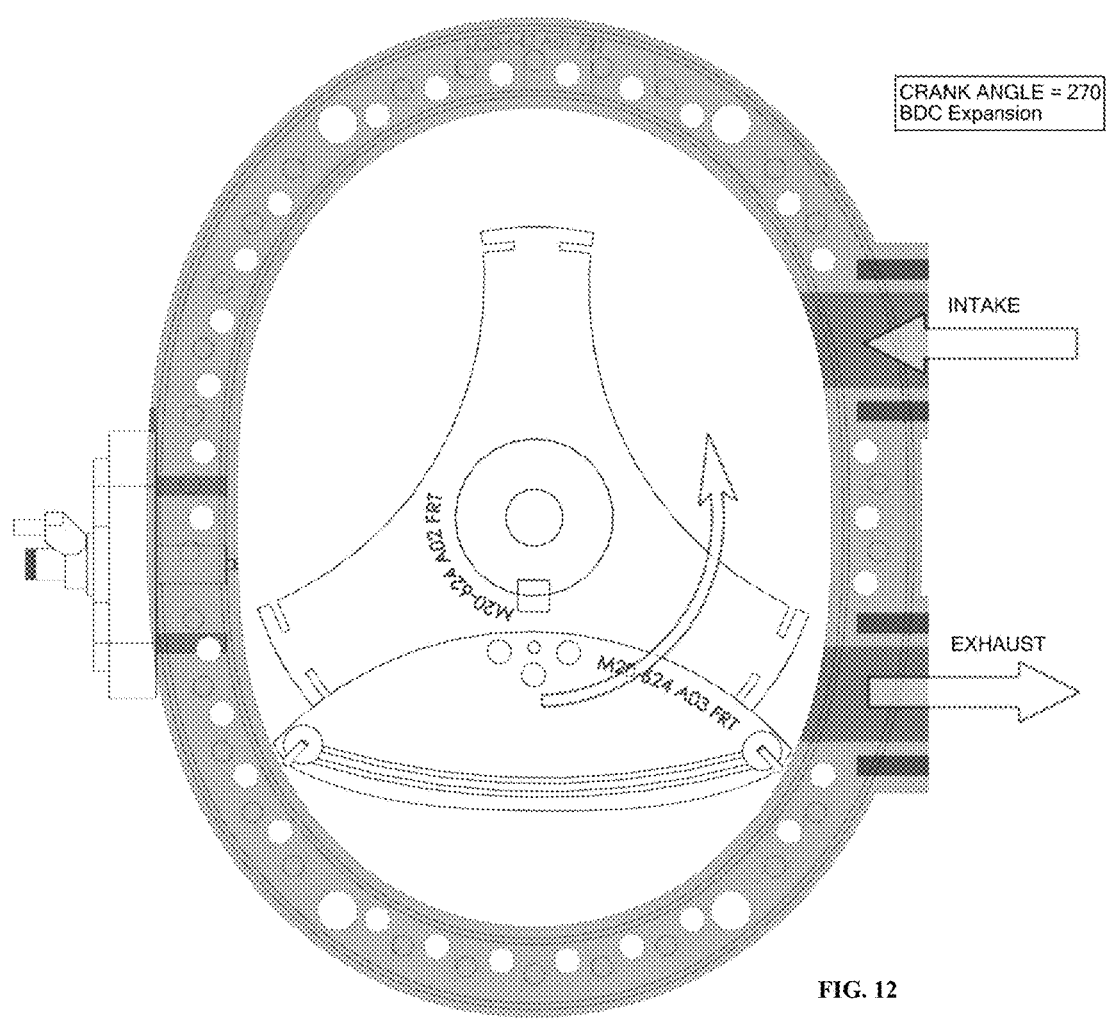
Figure 13:
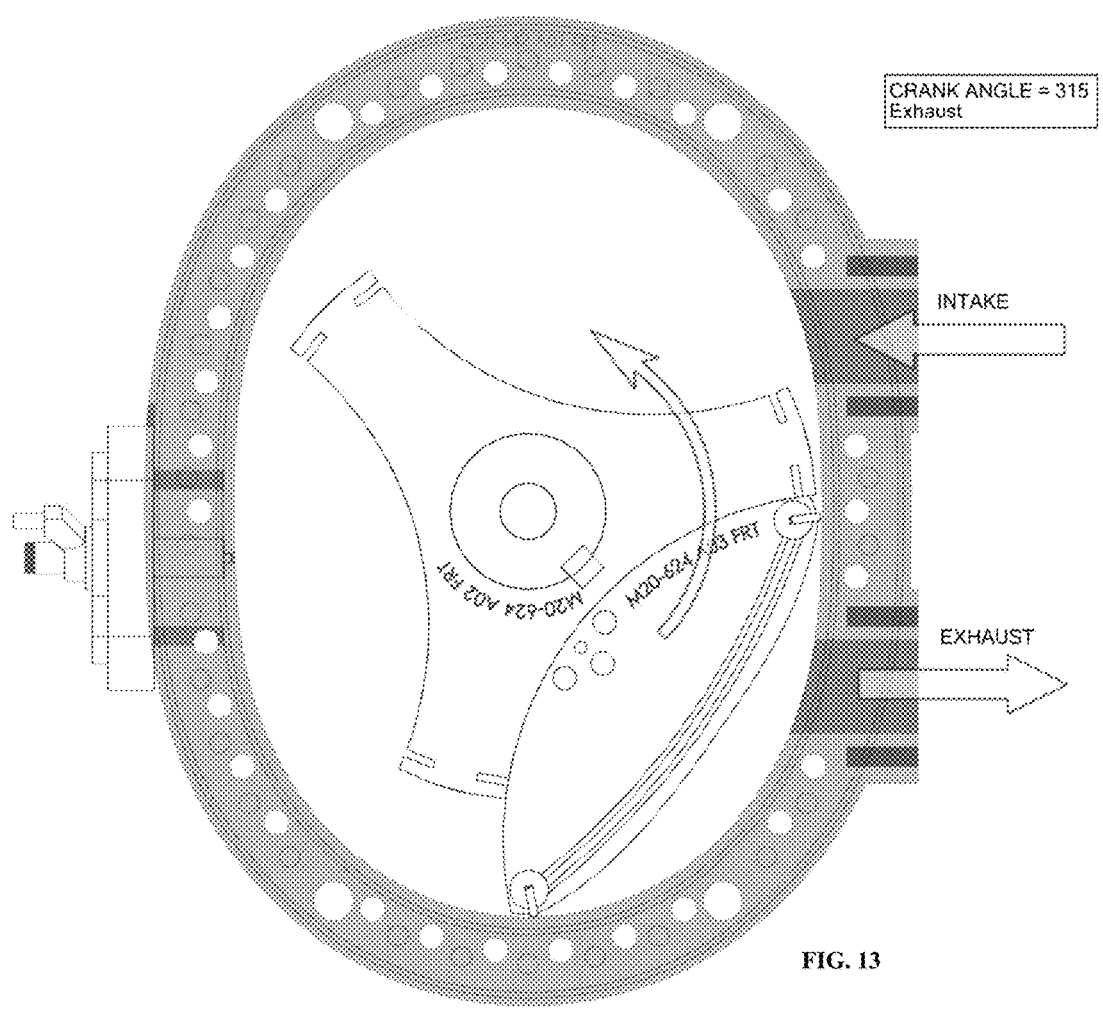

FIGS. 6-13 illustrate different stages of an exemplary combustion cycle using the embodiment of FIG. 1. FIG. 6 illustrates an embodiment with one contour present in the three o'clock position at 0 degrees at the beginning of a combustion cycle. The intake port through the housing is toward the upper end of the contour whereas the exhaust port through the housing is toward the lower end of the contour. FIG. 7 illustrates a further clockwise rotation of the main shaft and contour of 45 degrees. This represents the intake portion of the cycle wherein a fuel and air mixture (in the case of an internal combustion engine) is taken into a working volume defined by the convex outer surface of the contour and the inwardly facing concave side wall of the housing. FIG. 8 illustrates a further 45° rotation counterclockwise that represents the bottom dead center ("BDC") portion of the cycle. At this point, the working volume is fluidly isolated from the intake path. As the counterclockwise rotation continues by another 45° to a total of 135° in FIG. 9, the compression portion of the stroke begins wherein the working volume decreases to compress the fuel-air mixture. FIG. 10 illustrates a further 45° movement counterclockwise such that the compression is at a maximum at the top dead center ("TDC") portion of the cycle. At this point, the combustion event is initiated by a spark plug, or solely by compression of the fuel air mixture (e.g., diesel cycle). FIG. 11 illustrates a further 45° rotation to 225° through the cycle illustrating the expansion portion of the cycle, which coincides with enlargement of the working volume between the outer surface of the contour and the inner surface of the housing. FIG. 12 illustrates still a further 45° counterclockwise rotation of the main shaft to a further BDC position, while FIG. 13 illustrates the exhaust portion of the cycle wherein the working gases are permitted to escape the engine.

Figure 14:
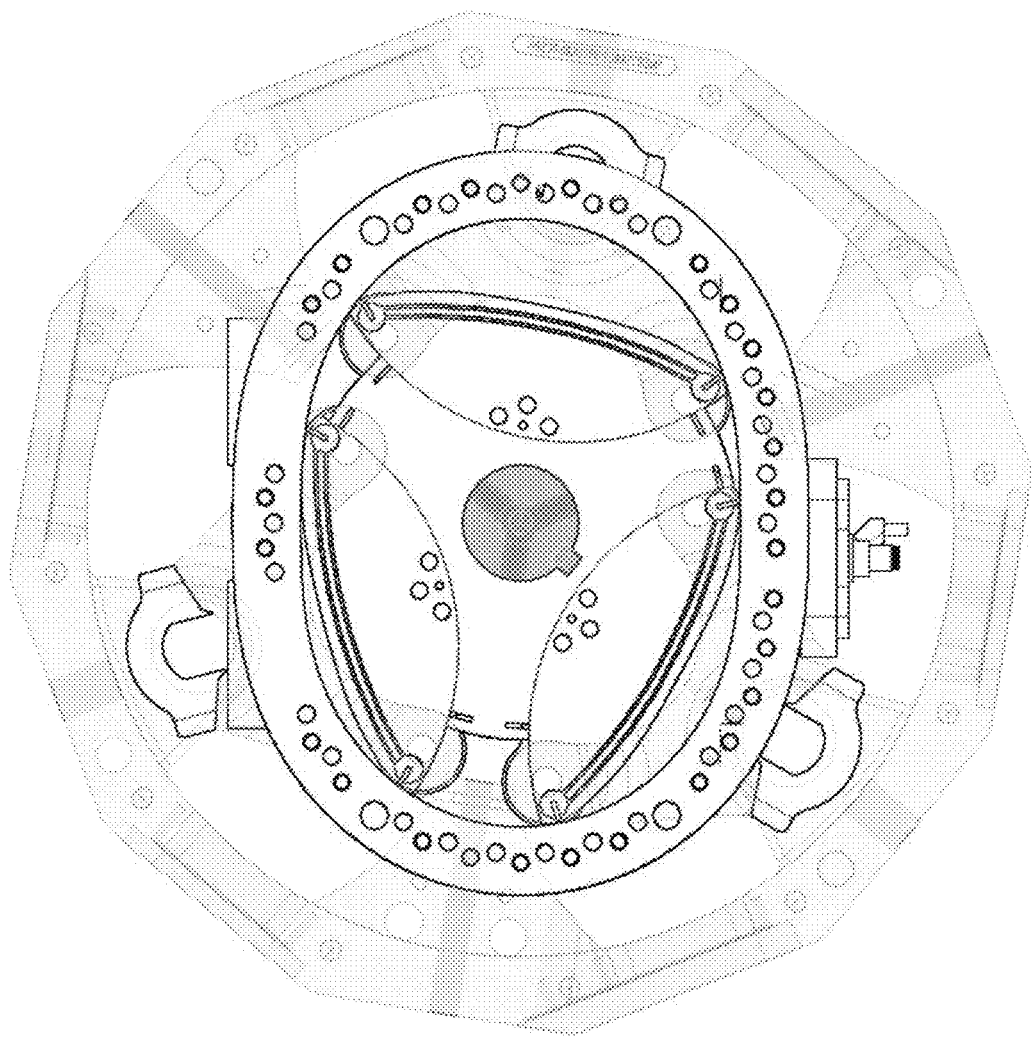
FIG. 14 illustrates a further end cut-away view of the embodiment of FIG. 1.
Figure 15:
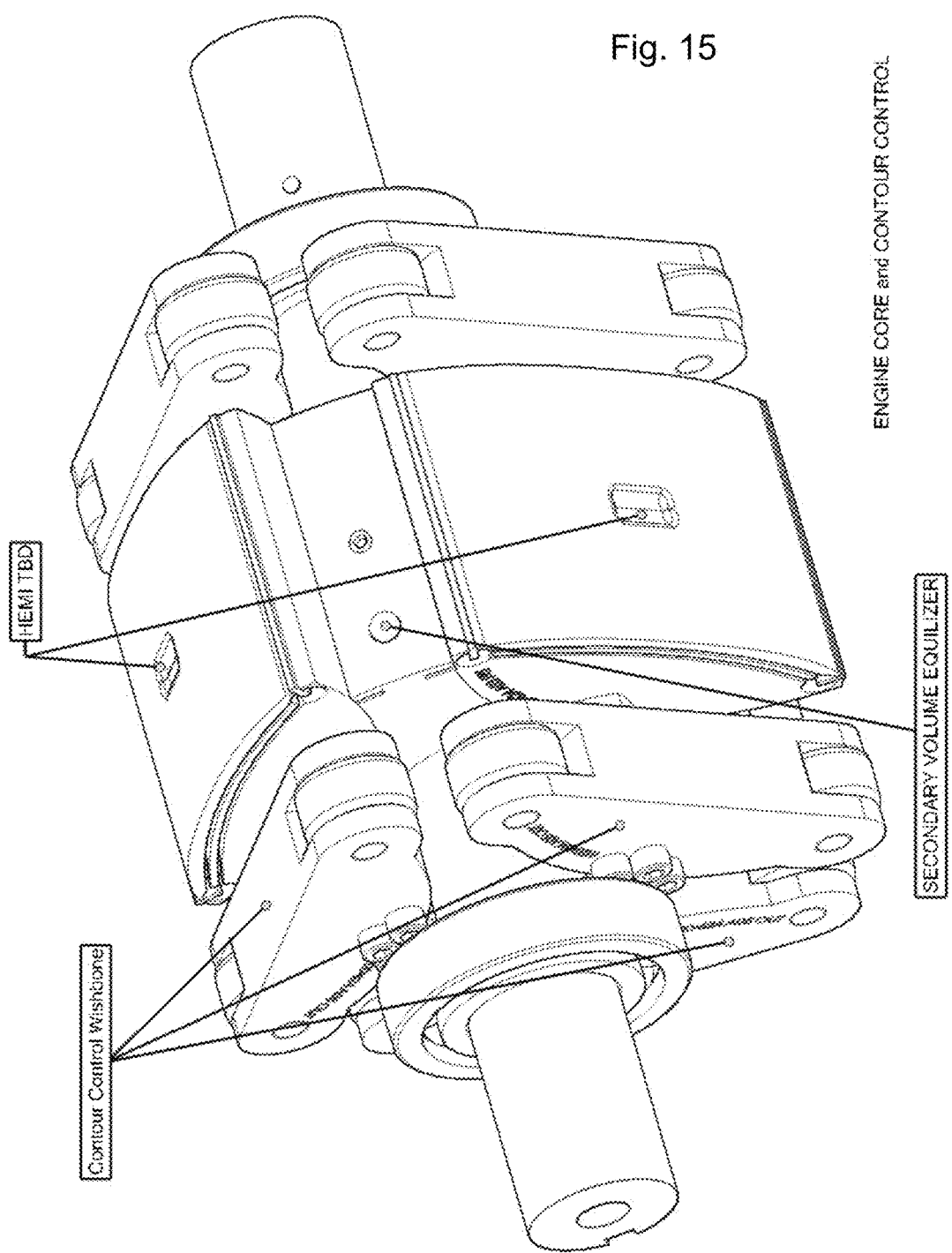
FIG. 15 is an isometric view of the central shaft and hub with contours and bearings mounted thereon.
Figure 16:
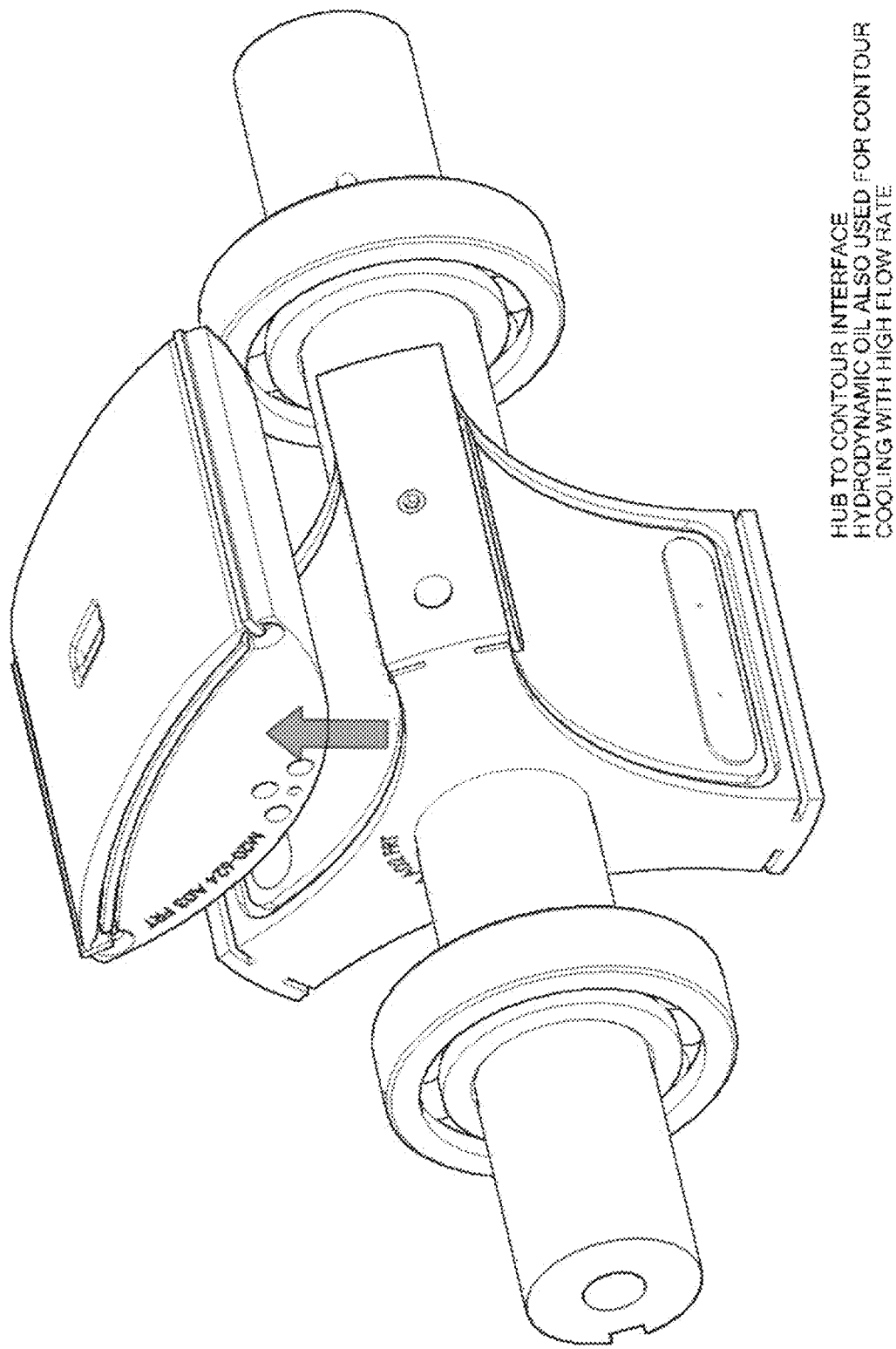
FIG. 16 is an isometric view of the central shaft and hub and a portion of one of the contours.

FIG. 14 is a cross section of the embodiment of FIG. 1, and illustrates the locations of seals on each of the three contours for defining three working volumes during operation of the device. FIG. 15 illustrates the center shaft and bearings with the hub mounted thereon, and three contours mounted on the hub. FIG. 16 illustrates an exploded view of the hub/contour interface.

Figure 17:
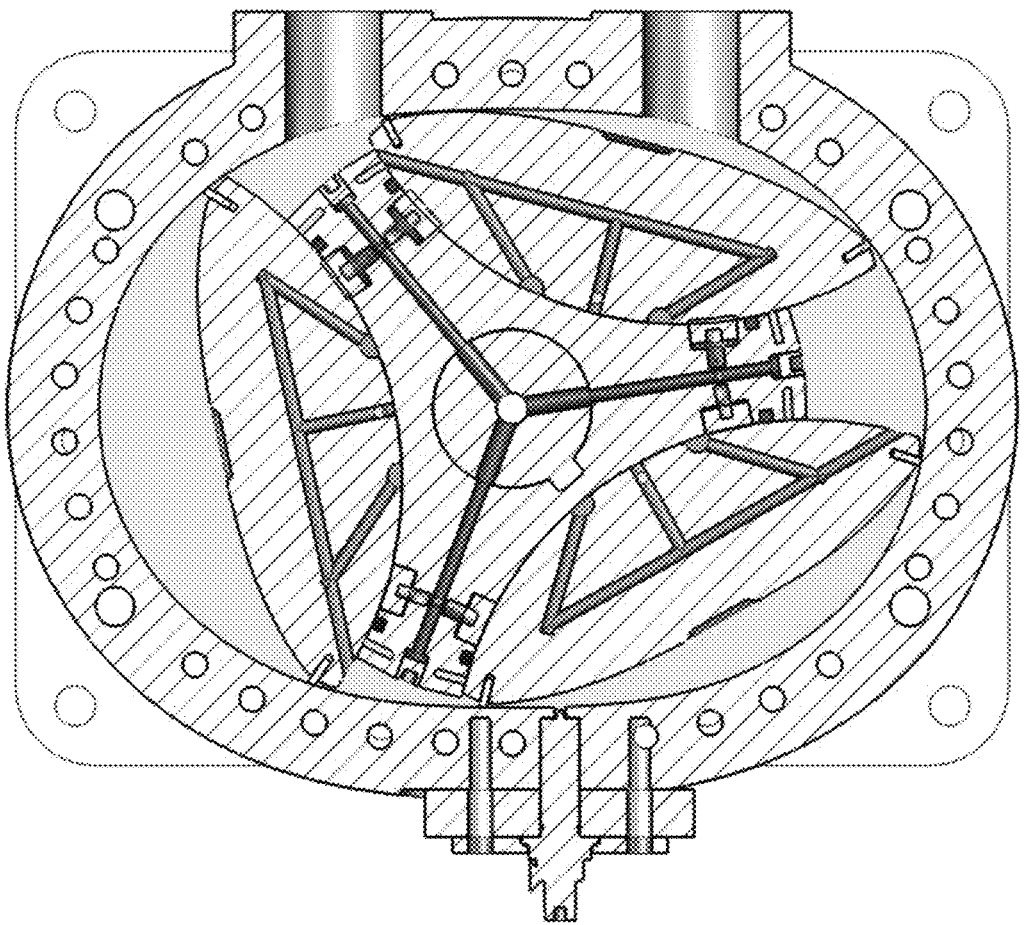
FIG. 17 is a cut-away view of the embodiment of FIG. 1 illustrating the routing of lubrication passages.
Figure 18:
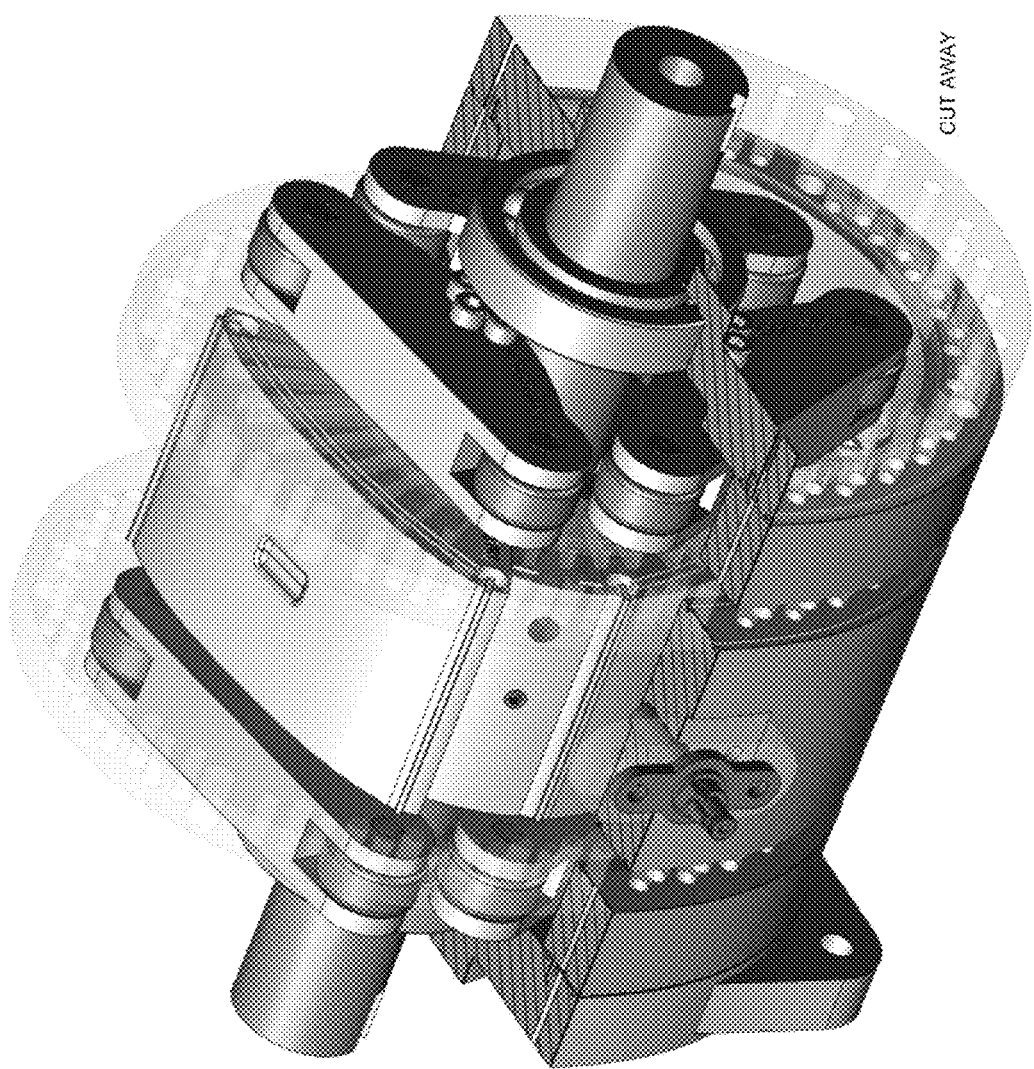
FIG. 18 is an isometric view of the central shaft and hub with contours and bearings mounted thereon seated within a lower portion of the housing (cut-away view)
Figure 19:
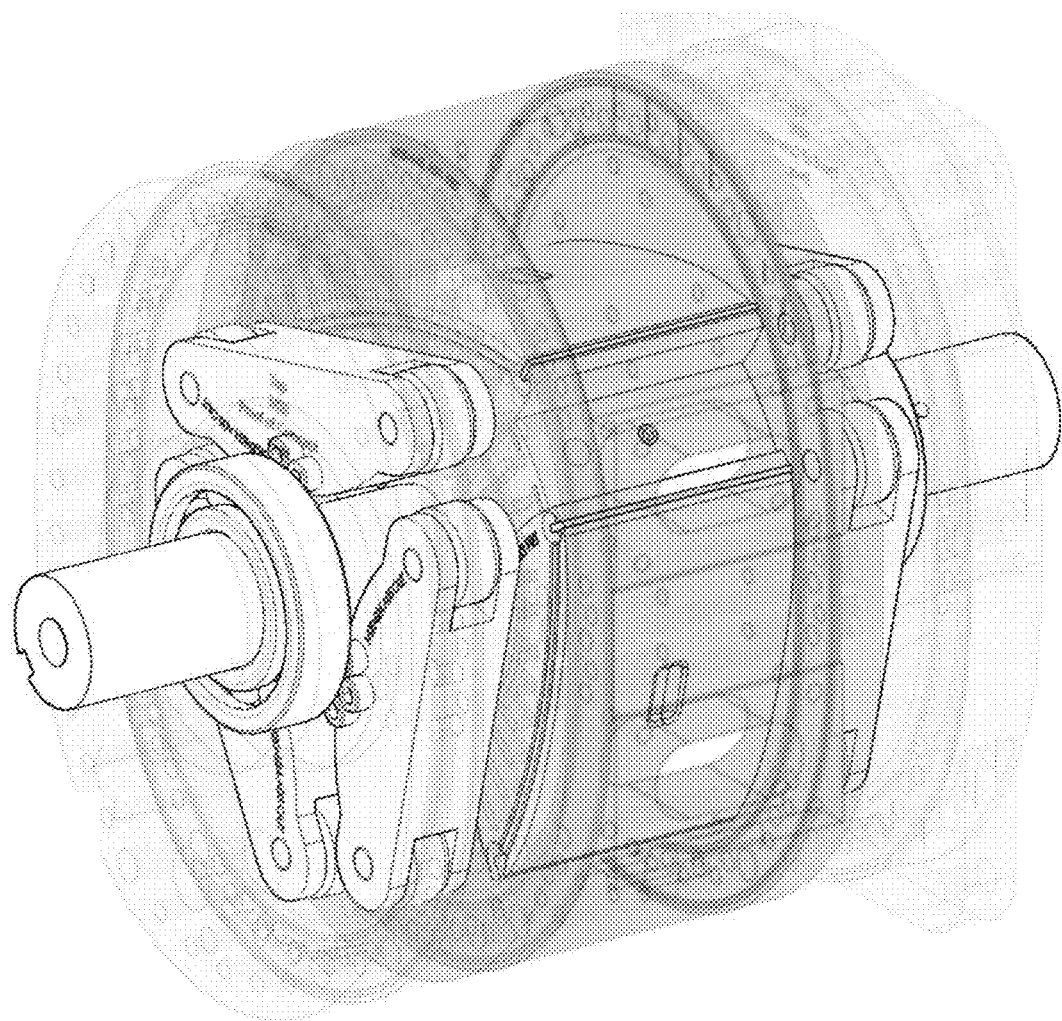
FIG. 19 is a wire frame view illustrating relative placement of the different components of the embodiment of FIG. 1.

FIG. 17 illustrates lubrication passageways through the hub and the contours. As illustrated, oil or other lubricant is sent axially down the main shaft where it is divided into flow channels that extend into each arm of the hub. Toward the end of each arm of the hub, the flow splits again to provide at least two ports for lubricating the interface between each contour and the hub. Additional passages are provided within each contour for taking up the lubricant and passing it through the contour and out through an exit port into the engine housing where it can get picked up and recycled. FIG. 18 is an isometric view of the engine with the upper half of the housing cut away to reveal the contours mounted on the central hub. FIG. 19 is a wire frame view of all of the engine components in an assembled condition.

A second embodiment of the disclosed rotary machine is found in FIGS. 20-25. The functional motion and combustion chamber animation is similar to the above embodiment but the motion is created with gears, connecting rods, swing arms and discs.

Figure 20:
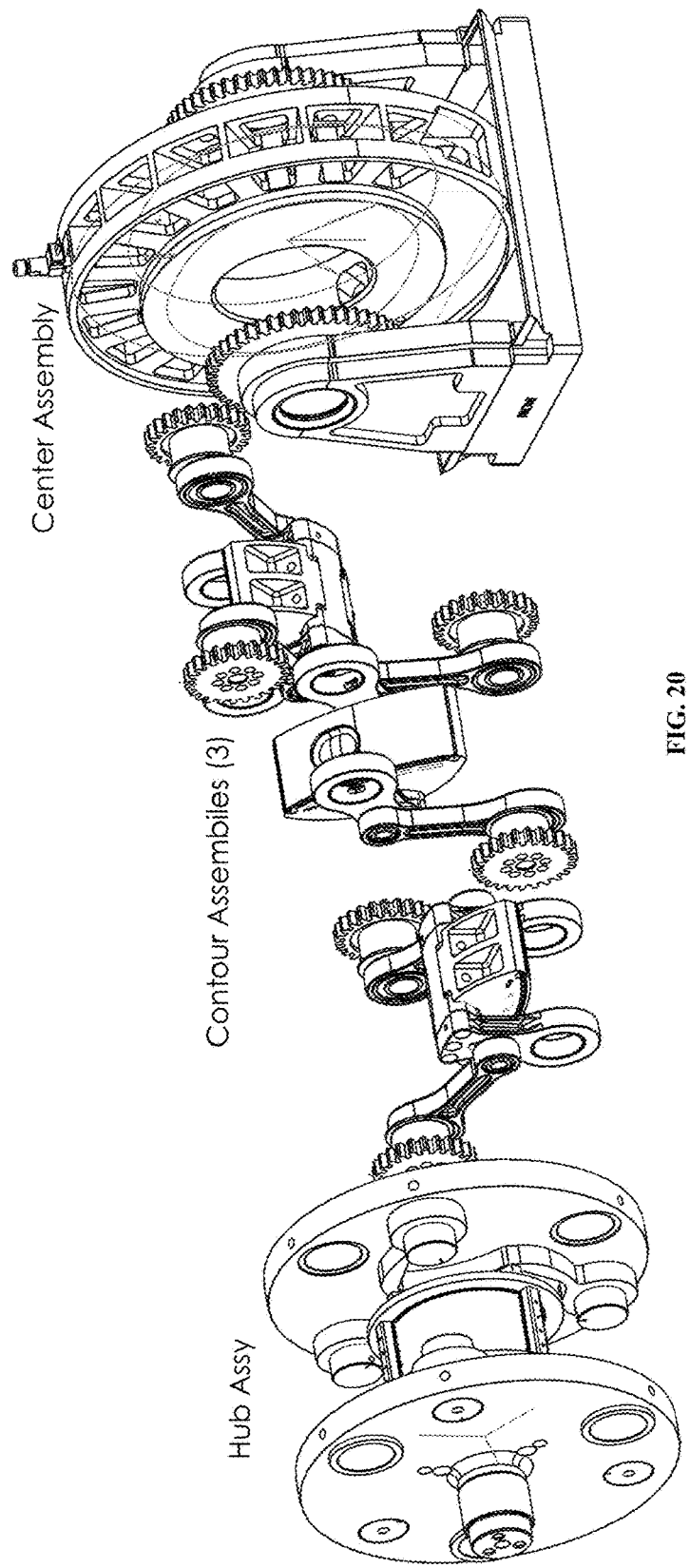
FIG. 20 is an exploded view of a second embodiment.

FIG. 20 shows an exploded view of the stationary center assembly, three contour assemblies and a hub assembly.

Figure 21:
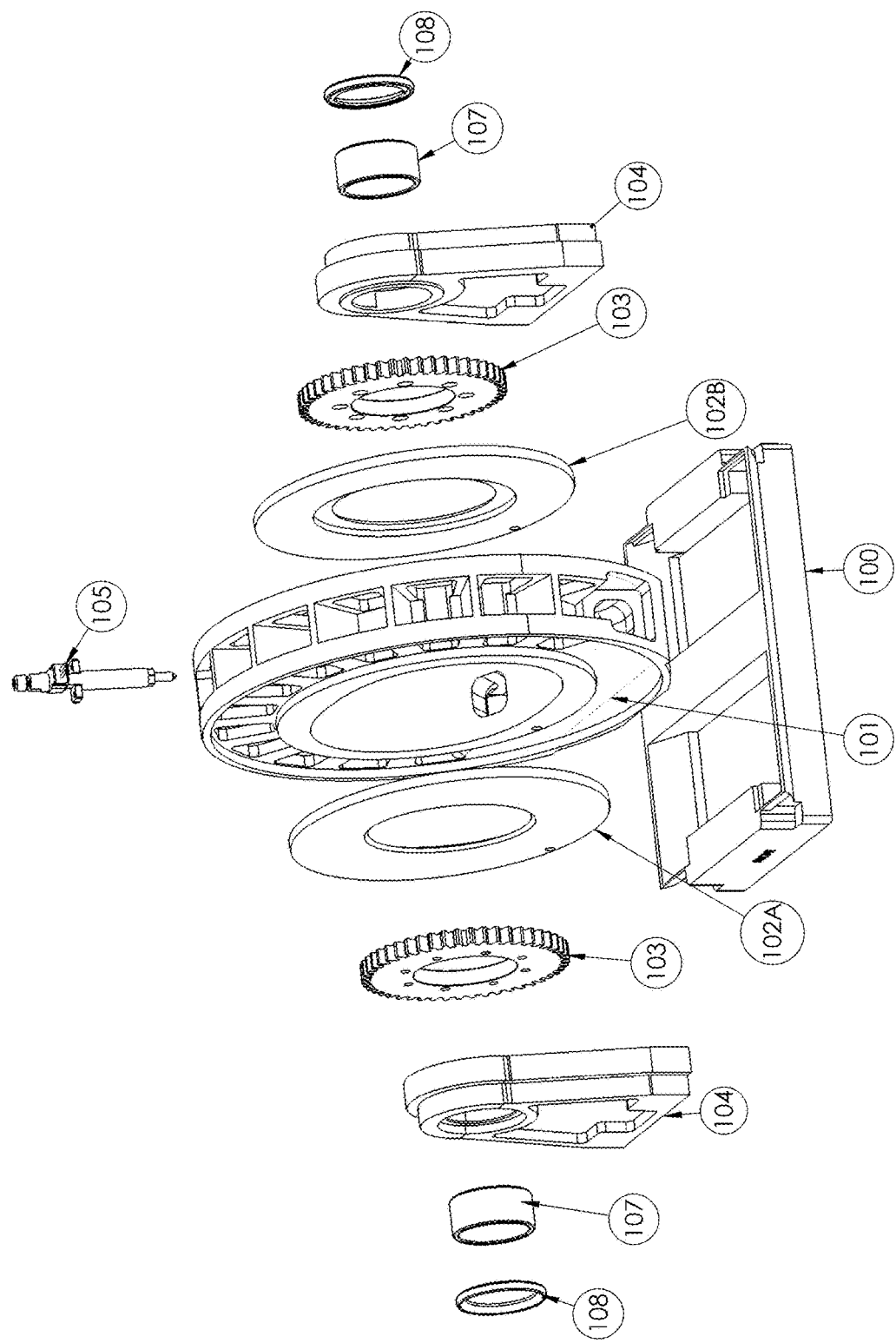
FIG. 21 is an exploded view of the center section of the second embodiment.

The center assembly is stationary and is shown assembled in FIG. 20 and in an exploded view in FIG. 21. Base 100 forms the foundation to which two main bearing supports, 104 are mounted to or part of base 100. Within each bearing support, are low friction bearing 107 and oil seal 108. Near the middle of the base is mounted center section 101. The inner surface of the center section 101 forms the outer surface of the combustion chambers. Encasing the sides of the combustion chambers are side plates 102A and B, each such side plate having an inner surface facing the combustion chamber, and an opposing outer surface. Each side plate is generally annular in shape, but being defined by an oval-like shape on their outer periphery, and defining a circular (or other shaped) opening therethrough having an inner diameter. Side plates 102A and 102B are mirror images of each other. Each side plate includes an inwardly facing recessed area, or lip, defined about the opening through the plate, configured to receive member 114 illustrated in FIG. 22.

For compression ignition, fuel injector 105 is located so it sprays fuel into the combustion chamber. If the embodiment is spark ignited, a sparkplug can be located similarly.

In this second embodiment, one or two stationary gears 103, are mounted such they are concentric with the main bearings and axis of rotation "A". These gears do not move, but are precisely timed to the following moving parts.

Figure 22:
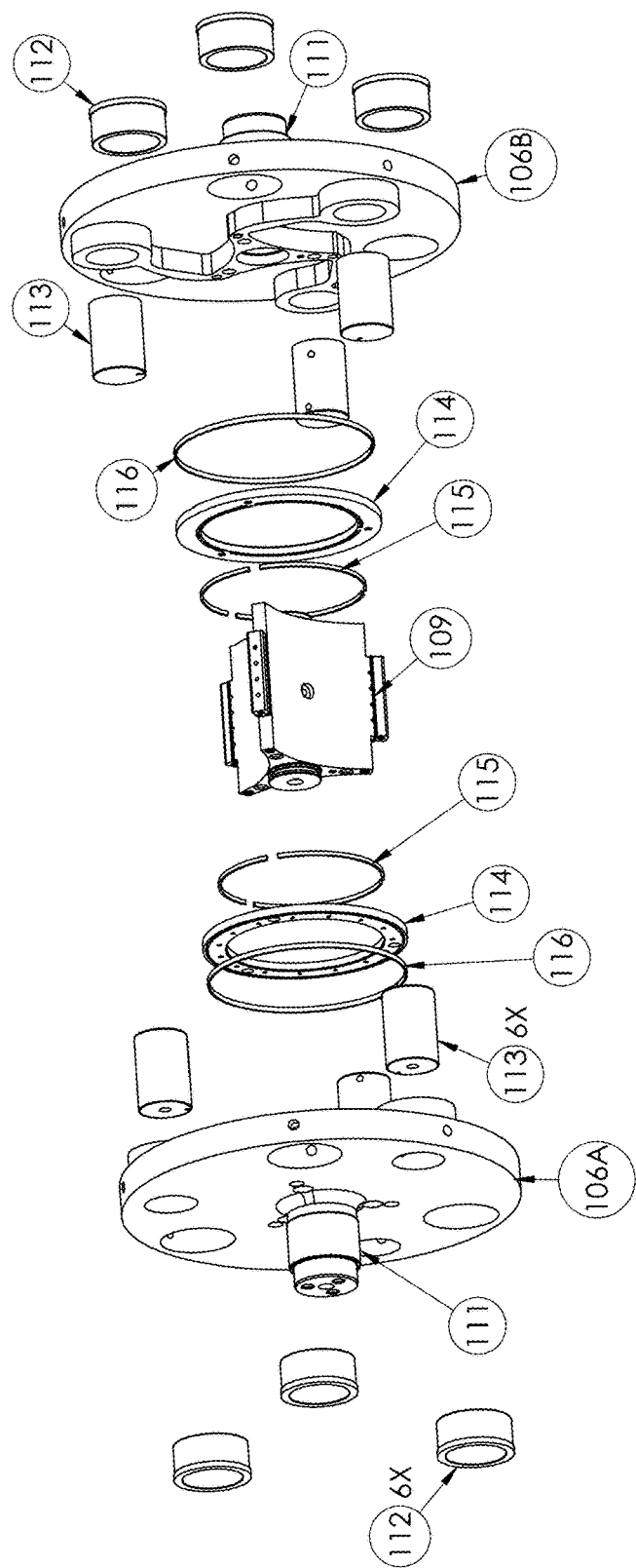
FIG. 22 is an exploded view of the rotating hub assembly of the second embodiment.

FIG. 22 shows the revolving Hub Assembly of the second embodiment. All parts in this assembly rotate concentrically to the center line of the axis "A" and bearings 107 of FIG. 21. The center hub 109, is attached or is one in the same to discs 106A and 106B. Disc 106B is substantially the mirror image of disc 106A. At the center of rotating disks 106A & B, a shaft protrudes out that carries a rotary bearing surface or inner race 111 to accommodate bearings 107 of FIG. 21. Such combination 111/107 can be forced oil hydrostatic or frictionless rolling element type bearings.

Although the second embodiment shows the discs 106A, B as having a protrusion to accommodate bearing inner race 111, parts 106A, B and 109 could be altered to have a central shaft 8 as illustrated in FIGS. 2 and 3.

Each disc 106A and B preferably contains the following features. Three bearings 112 are fitted into each disc, for a total of six bearings. They are evenly dispersed about the axis A (120 degrees spacing) and their center lines are collinear with axis B shown in FIGS. 23-24. The shafts 113 are also fitted into or are part of each disc 106. They are evenly spaced about the axis of rotation as bearings 112 are and their centerlines are parallel to axis B. Discs 106 may also contain oil passageways or other features to support necessary fluid flows for oil lubrication and cooling.

In order to prevent gases from passing back or forth between the interior of the machine to the outer cavities which may contain oil or ambient air, side carrier rings 114 hold inwardly facing arced seals 115 and outwardly facing arced seals 116. The carrier rings and seals rotate with the assembly including the hub.

Figure 23:
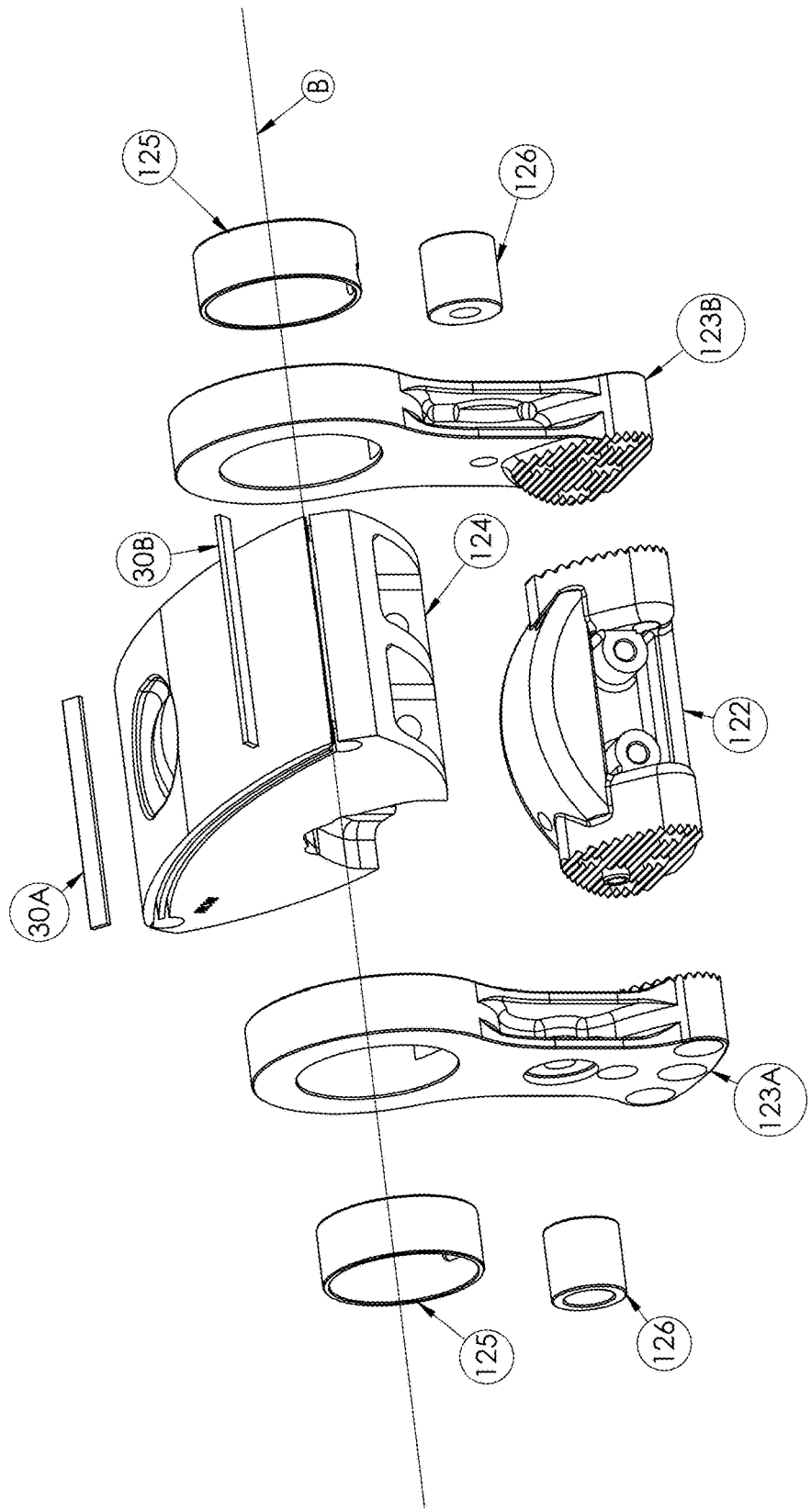
FIG. 23 is an exploded view of the contour assembly of the second embodiment.
Figure 24:
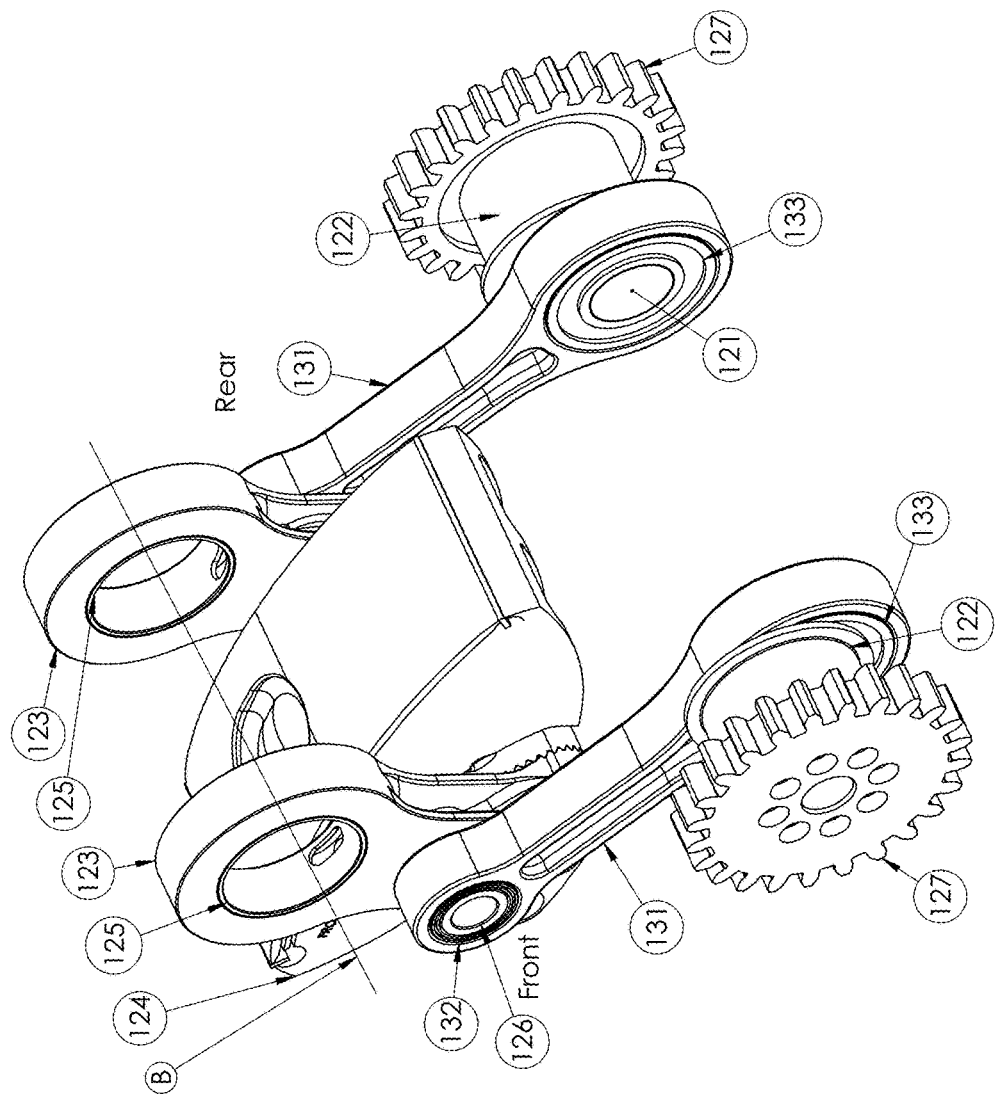
FIG. 24 is a view of the swing assembly and mechanism of the second embodiment.

The parts of FIG. 4, 4A in the first embodiment are replaced by the parts in FIGS. 23 and 24. FIG. 23 shows contour 124. For simplicity, the sealing system of Fig 4A is omitted from FIGS. 23 and 24 but would be present in actual use. Parts 23 A,B of FIG. 4A are replaced with swing arms 123A and 123B as shown in FIG. 23. The swing arms 123 A,B are attached to contour 124 by direct fasteners as in FIG. 4A or indirectly through a cross member 122. Cross member 122 is devised to be substantially stronger than the contour as it is required to withstand combustion loads. Swing arms 123A and B have bearings, oil pressure or frictionless element, 125 inserted into holes in the arms which are opposite the arm to contour 124, attachment points. These bearings, create a rotating axis "B" to which the whole assembly of FIG. 23, can pivot about. This pivot "B" axis is concentric to the previously cited "B" axis. Each Swing Arm, 123 has a Pin 126, attached to it or is part of it. It is the point to which a connecting rod is attached to and forces the swinging assembly's pivoting, oscillating action. The contour assemblies of FIG. 23 pass thru the center hole of the side plates 102A and B.

FIG. 24 contains the parts from FIG. 23 and shows that each swing arm pin 126, passes through bearing 132, which is located in one end of connecting rod 131. This assembly at the front is repeated at the rear.

Figure 25:
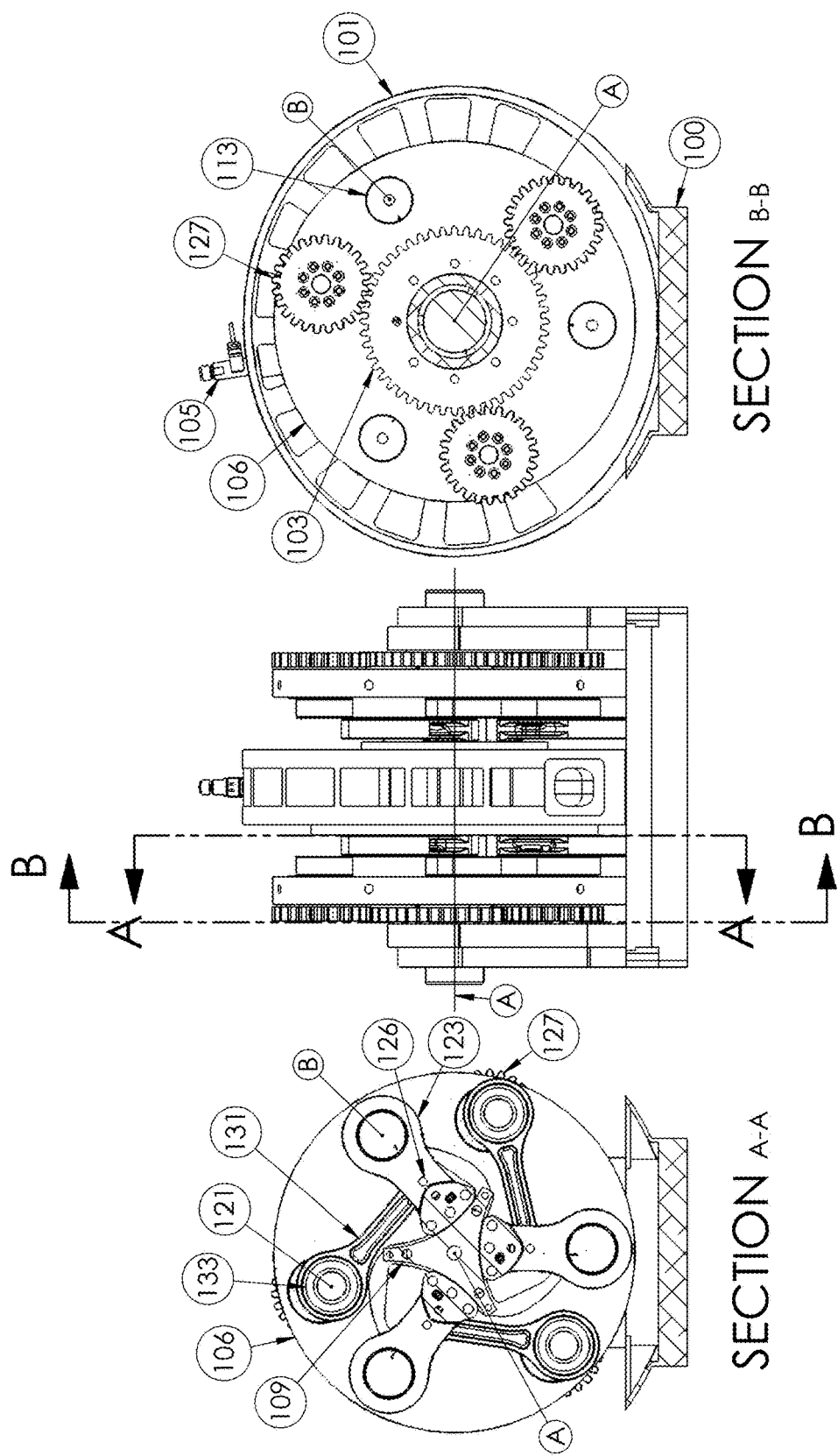
FIG. 25 is a side view of the machine and two section views of the second embodiment.

Passing through each bearing 112 of FIG. 22, are one each crankshafts 122. Six total in the embodiment. The end of each crankshaft 122 has an offset pin 121 of FIG. 24. Every crank offset pin 121 has a bearing 133, over it. Bearing 133 is mounted into the end of connecting rod 131, opposite from bearing 132. A gear, 127 is affixed to crankshaft 122 which causes crankshaft 122 to rotate. Three of the assemblies of FIG. 24 are mounted into the hub assembly of FIG. 22 and shown as fully assembled in FIG. 25. Each of three swing assemblies including contour, cross member, swing arms, either one or two connecting rods—cranks sets and all supporting parts orbit around the hub assembly's axis of rotation "A" as shown in FIG. 25. The swing arms 123 of each swinging assembly pivot about axis B and connecting rods 131 oscillate about pin 121.

FIG. 25, section B-B shows how crank gears 127 orbit about stationary gear 103. As Hub Assembly and 3 Swing Assemblies rotate about axis "A", there is a relative rotation of each crankshaft within the Hub Assembly.

Section A-A of FIG. 25 shows that each crankshaft offset pin 121 is attached to connecting rods 131 by bearing 133. All parts shown in this Section A-A view, orbit about the machine's axis "A" as discs 106 revolve. As the crankshaft 122 rotates, offset pin 121 causes arcuate oscillatory motion of the connecting rod 131. This motion moves pin 126 of the swing arm. Thus swing arm 123A, in unison with 123B cause the contour to move in an arcuate swinging motion about Axis B. This design is repeated 3 times as shown in the Section A-A. Thus a similar motion is derived as described in the first embodiment.

The gear ratio of 127 to 103 is set to 2:1 in the illustrated embodiment. Thus, contour 124 swings twice per one revolution of the hub assembly with respect to the hub assembly. When viewed from a stationary point, contour 124 can swing and orbit in a complex motion. Thus, when the inner shape of center ring 101 is carefully designed, the combustion chamber working volume is created by the contour's motion and no part of the moving mechanism, except for gears, seals or bearings, contacts the stationary parts. A close tolerance is maintained at minimum combustion volume, apex seal travel is reduced and friction is low.

It may be possible to eliminate one but not two of the drive assemblies and still be able to create the functional motion. That is to say, only one set of crank components and connecting rods can be used on one side of the engine. However, if only one set of the described crankshafts and connecting rods are used on only one side of the engine, front or rear, unbalanced forces may cause twisting of the contour as it rotates through its ideal plane of rotation. To reduce twisting, the mechanism of crankshaft and connecting rods is duplicated on both the front and the rear of the engine. The entire hub assembly of FIG. 22 is well balanced in its rotating plane and shall exhibit minimal vibration when it is spun at a high RPM.

A third embodiment of the invention illustrated in FIGS. 26-31 replaces the gear drive and connecting rod system with a simpler but potentially higher friction mechanism consisting of a forked swing arm, complex cam profile and hard cam follower.

Figure 26:
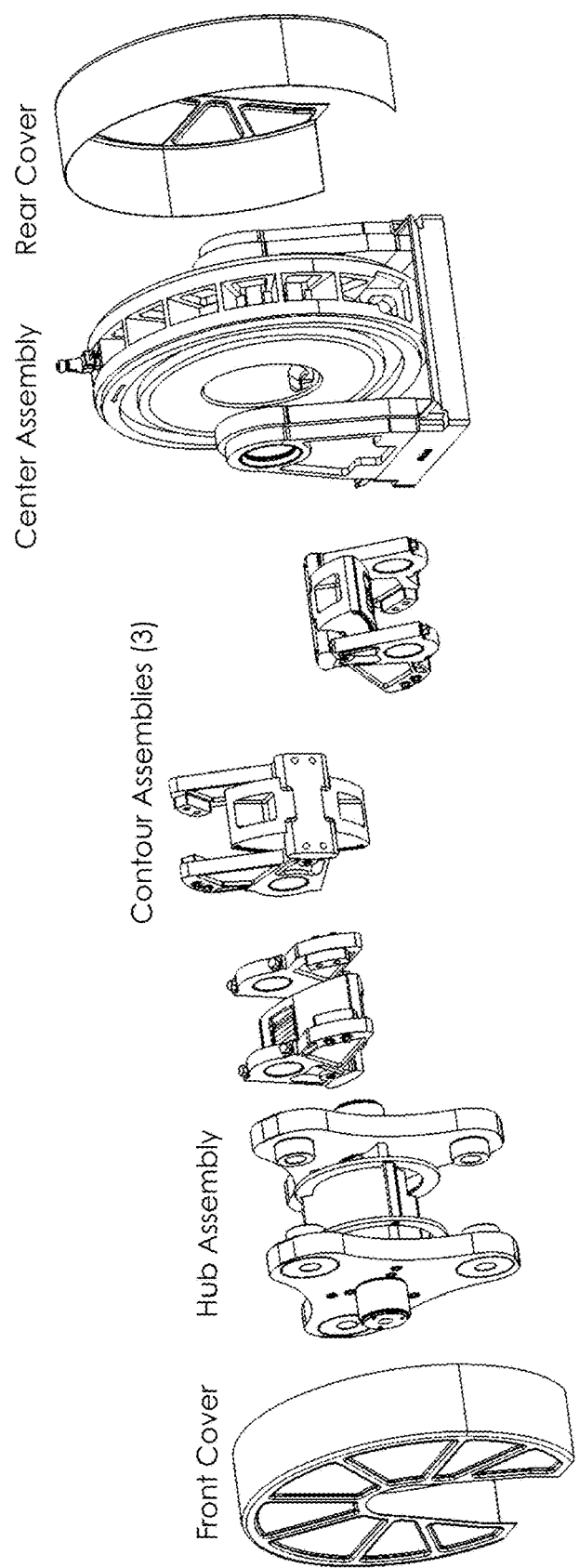
FIG. 26 is an exploded view of a third embodiment.

FIG. 26, shows a similar machine as FIG. 20. The center assembly is stationary as with the previous embodiment. A hub assembly and three swing assemblies are also present. FIG. 26 also shows front and rear covers which all embodiments shall have.

Figure 27:
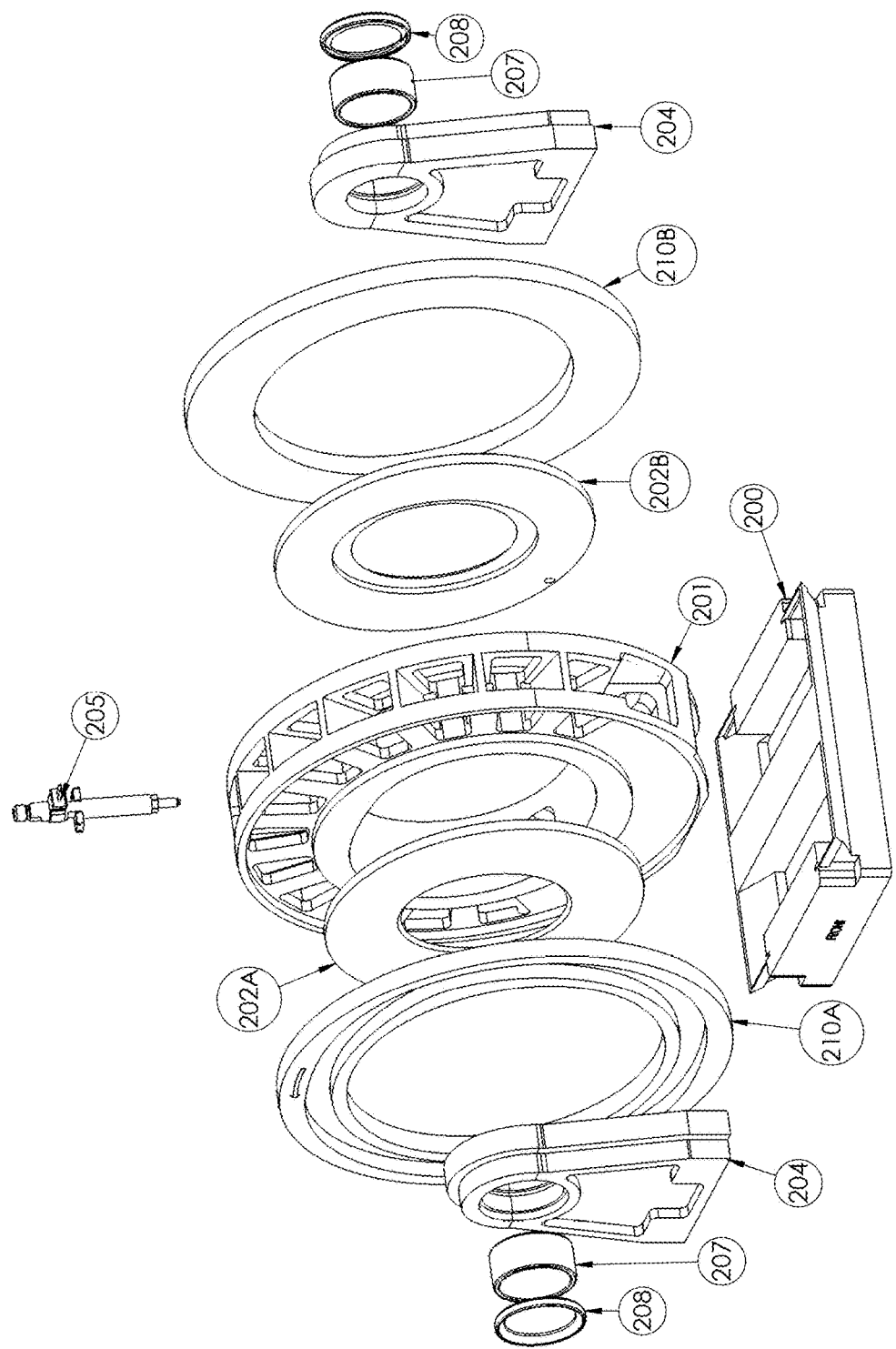
FIG. 27 is an exploded view of the center section of the third embodiment.

The center assembly of FIG. 27 has base foundation 200, attached to center section 201 and added bearing supports 204. Similar bearings 207 and seals 208, are also present in the bearing supports to hold the rotating hub assembly of FIG. 28. Side plates 202A and 202B contain the combustion volume sides as in the other embodiments. Fuel injector 205, in case of compression ignition, is inserted into the center section. Or a spark plug is used in case of spark ignited engine.

However, no stationary gear(s) are present. Instead cam rings 210A and 210B are shown in FIG. 27. 210A and 210B are substantially mirror images. The cam track profiles are designed into the cam rings as slots where the outer surface of the slot is one path and the inner surface is another path. The cam rings are attached to the center section and are generally made of hard, wear resistant materials such as hardened steel and/or ceramics.

Figure 28:
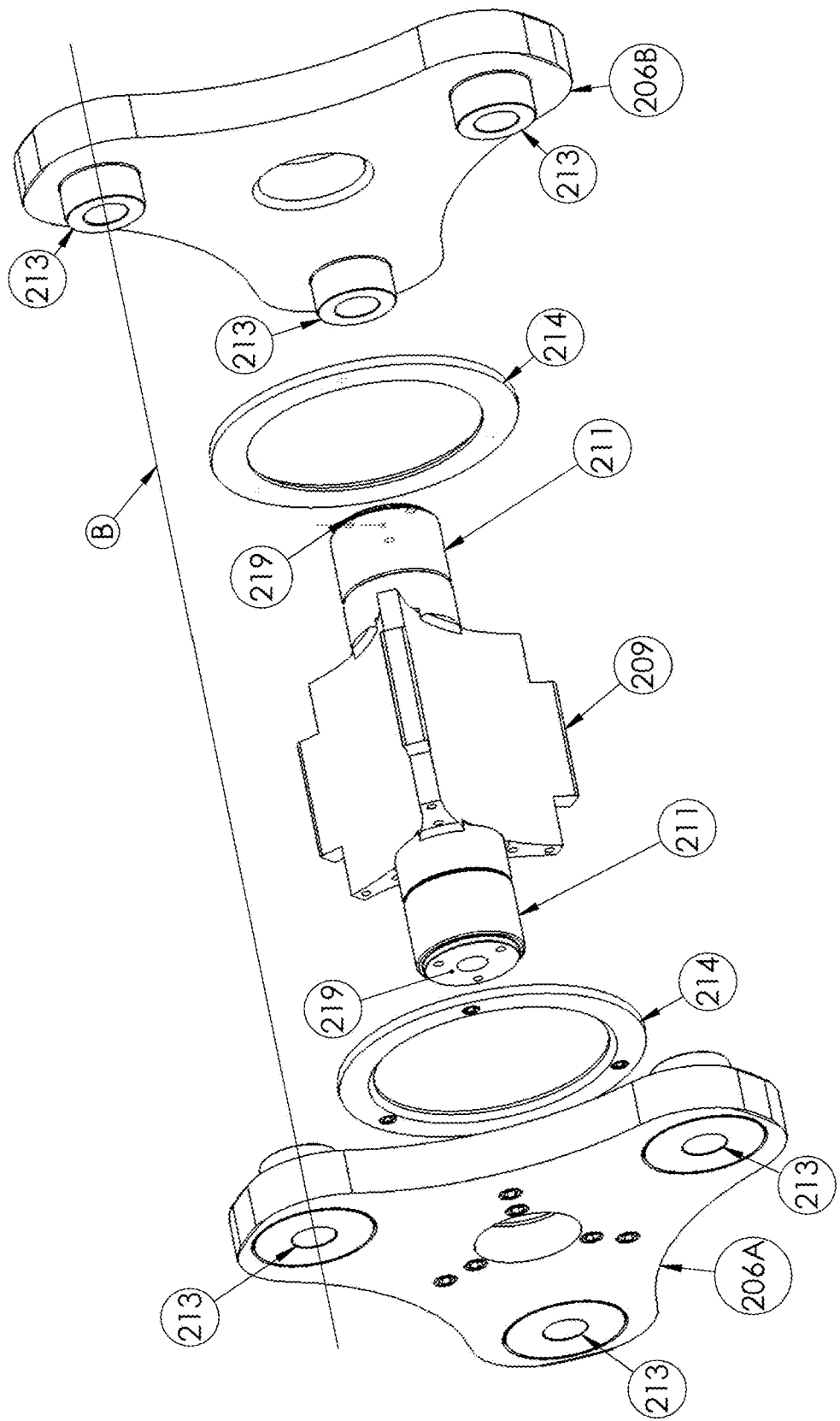
FIG. 28 is an exploded view of the rotating hub assembly of the third embodiment.

FIG. 28 shows the rotating hub assembly of the third embodiment. Center hub part 209 is another variation of those disclosed herein above. In this case, as might be used in other embodiments, the ends of the hub are extended to create or support the two bearing surfaces 211. Then discs 206A and 206B, which have a hole in the center, are fitted over the bearing surfaces 211 and fastened to the center hub 209.

Discs 206A and 206B have shafts 213 in 3 pairs, total quantity 6, attached to them or are part of them. As described in previous embodiments, axis B is disposed through the center of the 213 shaft pairs. Seal carrier rings 214 are also present on both sides of the hub. Similar seals 115, 116, not shown, are used as shown in FIG. 22 but inserted into the rings 214. Power take off of the engine is attached to 219 flange surfaces shown in FIG. 28.

Figure 29:
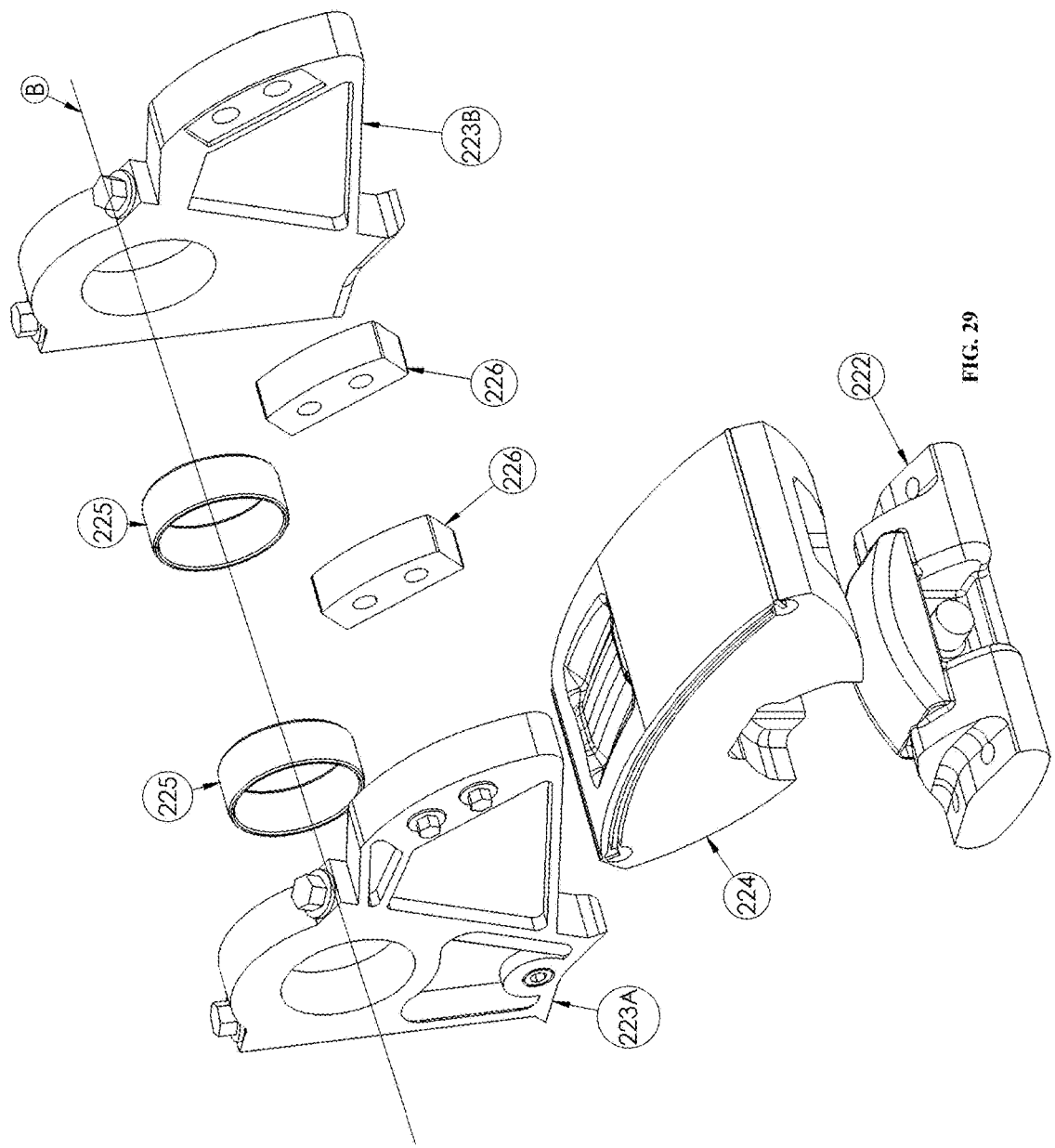
FIG. 29 is an exploded view of the contour assembly of the third embodiment.

The third embodiment has three identical swinging contour assemblies a shown in FIG. 26 and seen in detail on FIG. 29. Contour 224 is attached to cross member 222 in FIG. 29. Optionally, the function of cross member 222 can be incorporated into contour 224 thus merging two parts into one as shown in FIG. 4A. Swing arms 223A and 223B are attached to cross member 222, or directly to 224. Arm 223A is a mirror of 223B. In each swing arm 223, opposite from the attachment to the contour/cross member, is a hole to which bearing 225 is placed. The rotation center line of these pair of bearings forms axis of rotation B.

Each swing arm 223 has a form with a branch of structure that extends out from the axis of rotation B to which is attached a cam follower device 226. Devices 226 are made from considerably hard steel or other materials that can resist wear. While 226 is shown as a simple wear pad, it could include one or more rollers 22 as shown in FIG. 4. Bi-directional forces tangent to this pad or roller will cause the whole contour assembly to bi-directionally pivot about axis B.

Figure 30:
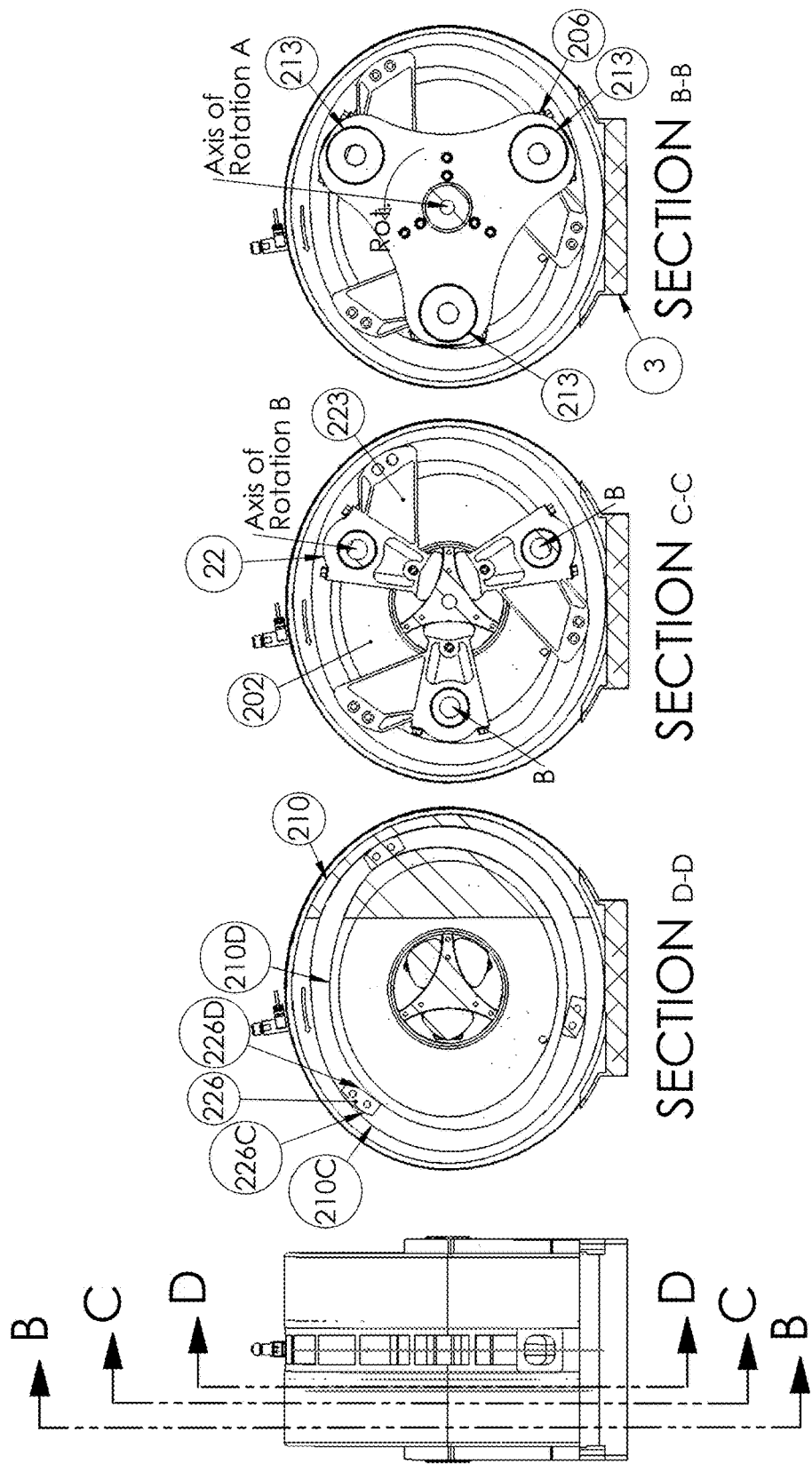
FIG. 30 is a side view of the machine and 3 section views of the third embodiment.

FIG. 30 shows cross sections of the third embodiment when fully assembled. FIG. 30, Section B-B shows the machines main axis of rotation "A" perpendicular to the page. Disk 206, which spins about axis "A", has three shafts, 213, that orbit about the Axis "A". Concentric with these shafts are bearings 225 of FIG. 29 and have same axis of rotation, B. The contour assemblies are repeated two more times as shown in Section C-C of FIG. 30 resulting in three spaced apart axes of rotation "B" which in turn orbit about axis "A". The contour assemblies of FIG. 29 pass thru the center hole of the side plates 202A and B.

The oscillatory swinging and revolving motion of the contour assembly is created by the interaction of the moving cam followers 226 and stationary cam rings 210A and 210B. The swing arm, cam follower and cam track mechanism is repeated on front and rear sides to reduce the twisting forces on contour 224. The cam follower 226 and the cam track 210 have two opposing working surfaces that define the cam track as noted in FIG. 30, Section D-D. When the motion of the swing arm is required to swing one way, cam follower surface 226C contacts cam track surface 210C. When the swing arm must swing the other way, cam follower surface 226D contacts surface 210D.

The shapes of both cam followers contact surfaces 226C, D and cam track surfaces 210C, D are devised so that contour 124 swings twice per one revolution of the hub assembly with respect to the hub assembly. When viewed from a stationary point, contour 124 will swing about axis B and orbit axis A thus making a complex or arbitrary but repetitive motion. Thus, when the inner shape of center ring 201 is carefully designed and matched to the moving outwardly facing surface of the contour 224, the combustion chamber working volume is created and no part of the moving mechanism, except for cams, seals or bearings, contacts the stationary parts. A close tolerance is maintained at minimum combustion volume, apex seal travel is reduced and friction is low.

Figure 31:
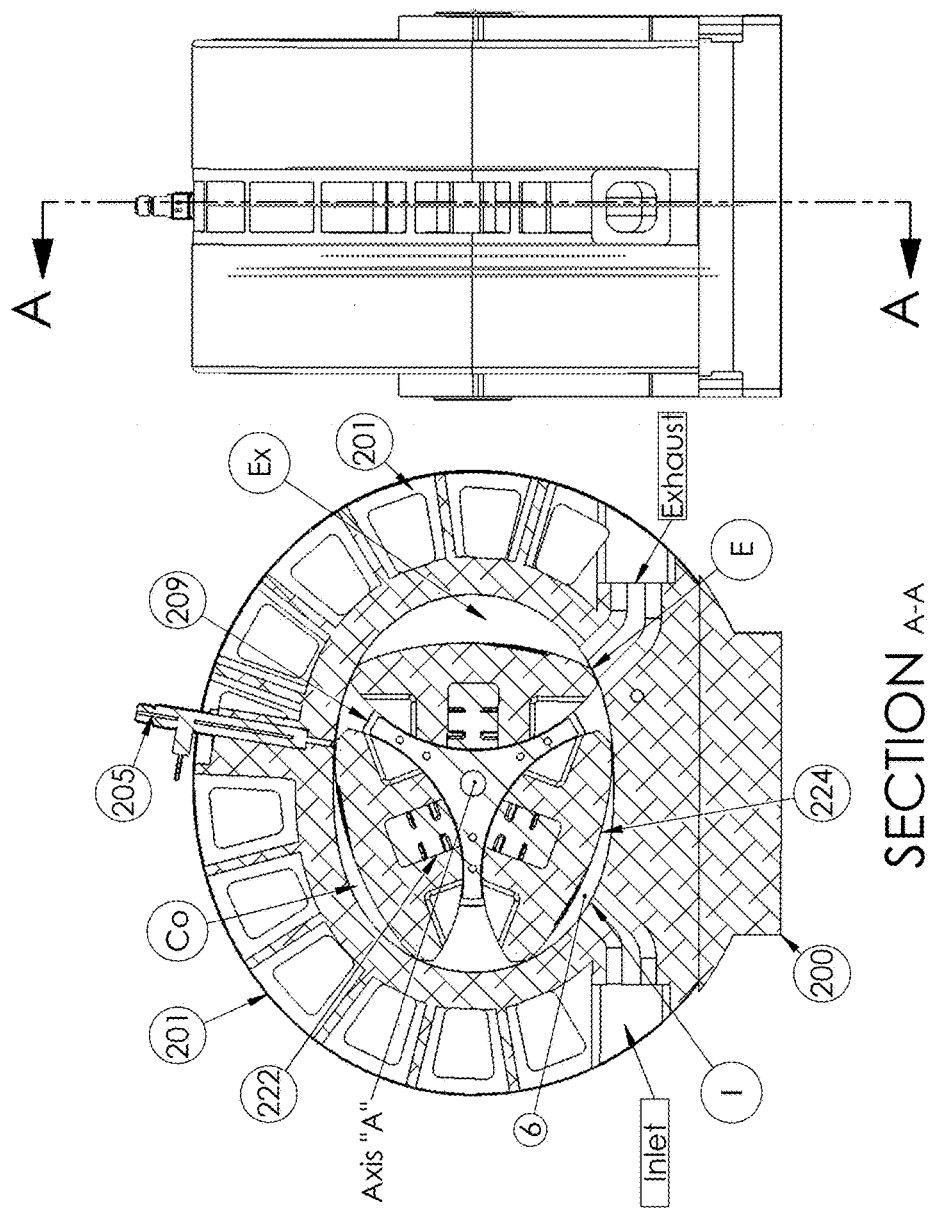
FIG. 31 is a side view of the machine and 1 section view of the third embodiment.

FIG. 31 is like FIG. 5, but shows the machine rotated 90 degrees. It applies to all embodiments. The incoming fresh air enters the engine and into the working volume chamber 6 through intake port "I" as the Hub Assembly rotates clockwise about axis "A". After the trailing edge of contour 224 leaves the intake port "I" area, the air charge is compressed as indicated in space "Co" of FIG. 30. As the Hub 209 rotates further and the air charge is highly compressed, fuel injector 205 will activate by external means at an optimal time or angle, rate and period using systems as described above. The interaction of high velocity fuel and compressed air will cause self-ignition and subsequent creation of power output through the Hub Assembly power take off flanges 219 of FIG. 28. Spent gases expand and then are pushed out as the working volume decreases at location "Ex". Gases leave the engine through port "E" out the Exhaust.

Although the present disclosure herein has been described with reference to particular preferred embodiments thereof, it is to be understood that these embodiments are merely illustrative of the principles and applications of the disclosure. Therefore, modifications may be made to these embodiments and other arrangements may be devised without departing from the spirit and scope of the disclosure. For example, while three contour assemblies are illustrated and are preferred, four or more contour assemblies can be used instead, and the remaining components of the engine can be adjusted accordingly.

What is claimed is:

1. A rotary machine, comprising:
   a) a stationary housing defining an inwardly facing continuously curved surface;
   b) a central shaft rotatably disposed within the stationary housing defining a central axis of rotation A, the central shaft having a first end and a second end attached to front and rear rotating discs, respectively;
   c) at least one swinging contour assembly defined by a pair of opposed outwardly facing front and rear surfaces that are connected by convex inwardly facing and outwardly facing surfaces, the convex inwardly facing surface of the contour assembly facing the central axis A, the convex outwardly facing surface of the contour facing the inwardly facing continuously curved surface of the stationary housing, the convex outwardly facing surface of the contour, the front and rear rotating discs and the inwardly facing continuous curved surface of the stationary housing cooperating to form a working volume, said at least one swinging contour assembly further including at least one seal to help seal said working volume, the rotatable shaft and front and rear rotating discs being configured to rotate with respect to the stationary housing; and
   d) at least one swing arm attached to said at least one swinging contour assembly, said at least one swing arm being pivotally attached to at least one of said front and rear rotating discs, said at least one swing arm being configured and arranged to constrain the motion of said at least one swinging contour assembly to maintain a predetermined spacing between said at least one swinging contour assembly and said inwardly facing continuously curved surface of said stationary housing independently of action of said at least one seal.

2. The rotary machine of claim 1, wherein said at least one swing arm includes at least one planet gear operably coupled thereto, said at least one planet gear being configured to mesh with at least one sun gear.

3. The rotary machine of claim 2, wherein said at least one sun gear is stationary with respect to said stationary housing.

4. The rotary machine of claim 1, wherein said at least one swing arm includes two swing arms, each of said two swing arms being attached to respective front and rear sides of said at least one swinging contour assembly, each of said two swing arms being pivotally connected to said front and rear rotating discs, respectively.

5. The rotary machine of claim 4, wherein said at least one swinging contour assembly includes two swinging contour assemblies.

6. The rotary machine of claim 5, wherein components of the rotary machine further define at least one auxiliary variable volume that is located between adjacent end portions of said contour assemblies.

7. The rotary machine of claim 6, wherein the working volume is separated from the at least one auxiliary variable volume by at least one seal.

8. The rotary machine of claim 7, wherein a working volume is can be defined with respect to each of said two swinging contour assemblies, and further wherein the gases of a first working volume corresponding to a first of the two swinging contour assemblies cannot directly communicate with a second working volume corresponding to a second of the two swinging contour assemblies due to the presence of the at least one auxiliary variable volume being disposed between the first working volume and the second working volume.

9. The rotary machine of claim 4, wherein said at least one swinging contour assembly includes three swinging contour assemblies.

10. The rotary machine of claim 1, wherein the inwardly facing continuously curved surface defines at least one passage therethrough that includes a fuel injector disposed therein for injecting fuel into the working volume.

11. The rotary machine of claim 10, wherein the rotary machine is a compression ignition engine.

12. The rotary machine of claim 10, wherein the inwardly facing continuously curved surface defines at least one further passage therethrough that includes a spark plug disposed therein, and further wherein the rotary machine is a spark ignition engine.

13. The rotary machine of claim 1, wherein front and rear discs define passageways therethrough for accommodating flow of at least one of cooling fluid or a lubricating fluid.

14. The rotary machine of claim 1, wherein said at least one swinging contour assembly is configured to oscillate about an axis B that is parallel to and radially outwardly disposed from the central axis A, wherein the axis B of said at least one swinging contour assembly orbits about the central axis A when the rotary machine is operating.

15. The rotary machine of claim 14, wherein oscillatory motion of said at least one swinging contour assembly combined with the rotation of said at least one swinging contour assembly about the central axis A cooperate to form a compound motion.

16. The rotary machine of claim 1, wherein the working volume associated with the at least one swinging contour assembly increases and decreases in volume twice per revolution of the rotatable shaft.

17. The rotary machine of claim 1, wherein the stationary housing is affixed to a foundation that also supports a plurality of bearings that in turn rotatably supports the rotatable shaft about the axis A.

18. The rotary machine of claim 1, wherein the inwardly facing continuously curved surface is configured to contact seals attached to said at least one swinging contour assembly.

19. The rotary machine of claim 1, wherein the inwardly facing continuously curved surface includes a plurality of ports defined therethrough to permit the passage of gases through the ports as the rotary machine operates.

20. The rotary machine of claim 1, wherein the stationary housing includes two substantially parallel side plates oriented perpendicularly with respect to the axis A that permit the rotatable shaft to pass therethrough.

21. The rotary machine of claim 1, wherein at least one of the side plates and stationary housing include seals configured to withstand pressurization and channels for transporting at least one of a lubricant and a coolant.

22. The rotary machine of claim 1, wherein said at least one swing arm includes at least one cam follower coupled thereto, said at least one cam follower being configured and arranged to follow at least one cam track.

23. The rotary machine of claim 22, wherein said at least one cam follower includes at least one roller, said at least one roller being configured to roll along said at least one cam track.

24. The rotary machine of claim 22, wherein said at least one cam follower includes at least one wear pad, said at least one wear pad being configured to slide along said at least one cam track.

* * * * *